United States Patent [19]
Rugg et al.

[11] Patent Number: 5,638,349
[45] Date of Patent: Jun. 10, 1997

[54] CARTRIDGE HANDLING SYSTEM WITH DUAL CARTRIDGE ENGAGING ASSEMBLY

[75] Inventors: Jon D. Rugg, Greeley; Thomas E. Berg, Fort Collins, both of Colo.

[73] Assignee: Hewlett-Packard Company, Palo Alto, Calif.

[21] Appl. No.: 558,949

[22] Filed: Nov. 13, 1995

Related U.S. Application Data

[63] Continuation of Ser. No. 135,607, Oct. 12, 1993, abandoned.
[51] Int. Cl.⁶ .......................... G11B 17/22; G11B 15/68
[52] U.S. Cl. .................................. 369/36; 360/92
[58] Field of Search ................... 360/92, 96.5; 369/34, 369/36, 38, 39, 178; 414/280, 901; 901/39

[56] References Cited

U.S. PATENT DOCUMENTS

| | | | |
|---|---|---|---|
| 4,614,474 | 9/1986 | Sudo | 414/281 |
| 4,787,074 | 11/1988 | Deck et al. | 369/36 |
| 4,827,463 | 5/1989 | Motoyoshi et al. | 369/36 |
| 4,839,758 | 6/1989 | Honjoh | 360/99.06 |
| 4,912,575 | 3/1990 | Shioaski | 360/71 |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,043,962 | 8/1991 | Wanger et al. | 369/36 |
| 5,062,093 | 10/1991 | Christie et al. | 369/36 |
| 5,101,387 | 3/1992 | Wanger et al. | 369/36 |
| 5,150,341 | 9/1992 | Shibayama | 369/36 |
| 5,184,336 | 2/1993 | Wanger et al. | 369/34 |

*Primary Examiner*—Robert S. Tupper
*Assistant Examiner*—William J. Klimowicz

[57] ABSTRACT

A dual cartridge engaging assembly comprising a first cartridge engaging device for engaging a first cartridge and displacing it along a first longitudinal cartridge displacement path. The assembly also comprises a second cartridge engaging device for engaging a second cartridge and displacing it along a second longitudinal cartridge displacement path which is parallel to the first longitudinal cartridge displacement path. The assembly also comprises a unitary reversible drive for providing mechanical energy to produce the longitudinal displacement of the first and second cartridge engaging devices and to produce flipping displacement of the first and second cartridge engaging devices about a central longitudinal axis parallel to the first and second longitudinal cartridge displacement paths. The assembly also comprises a passively switchable linkage for transferring mechanical energy from the unitary reversible drive to the first and second cartridge engaging devices.

19 Claims, 11 Drawing Sheets

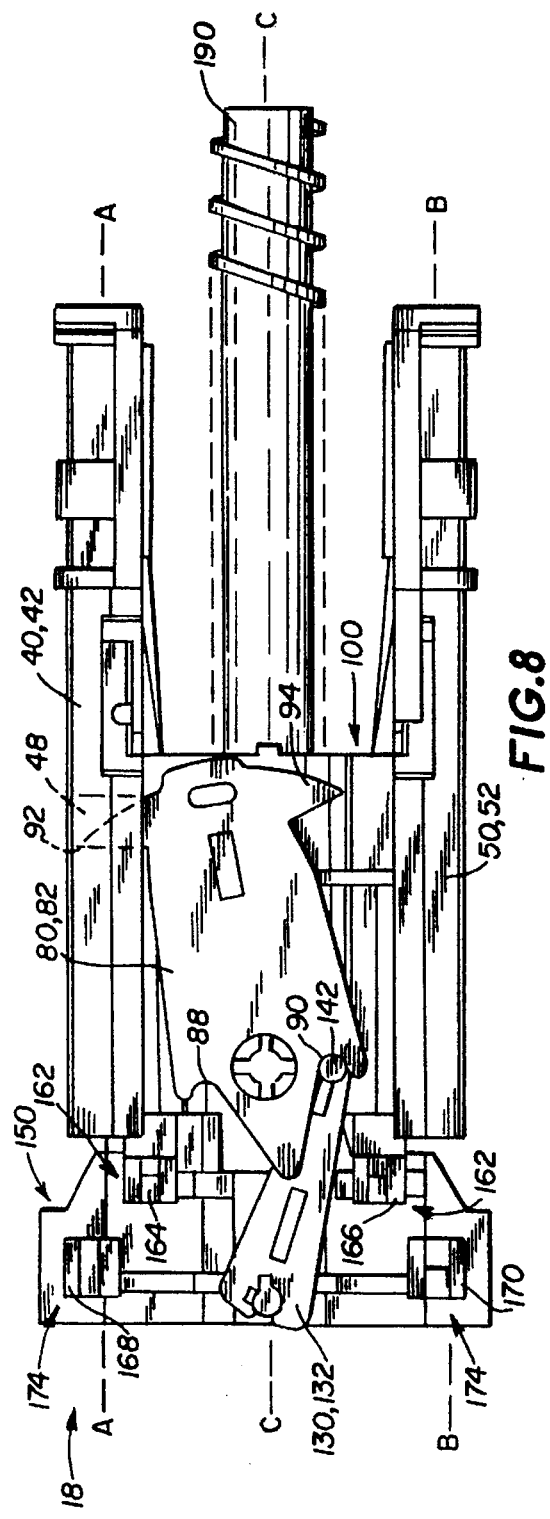
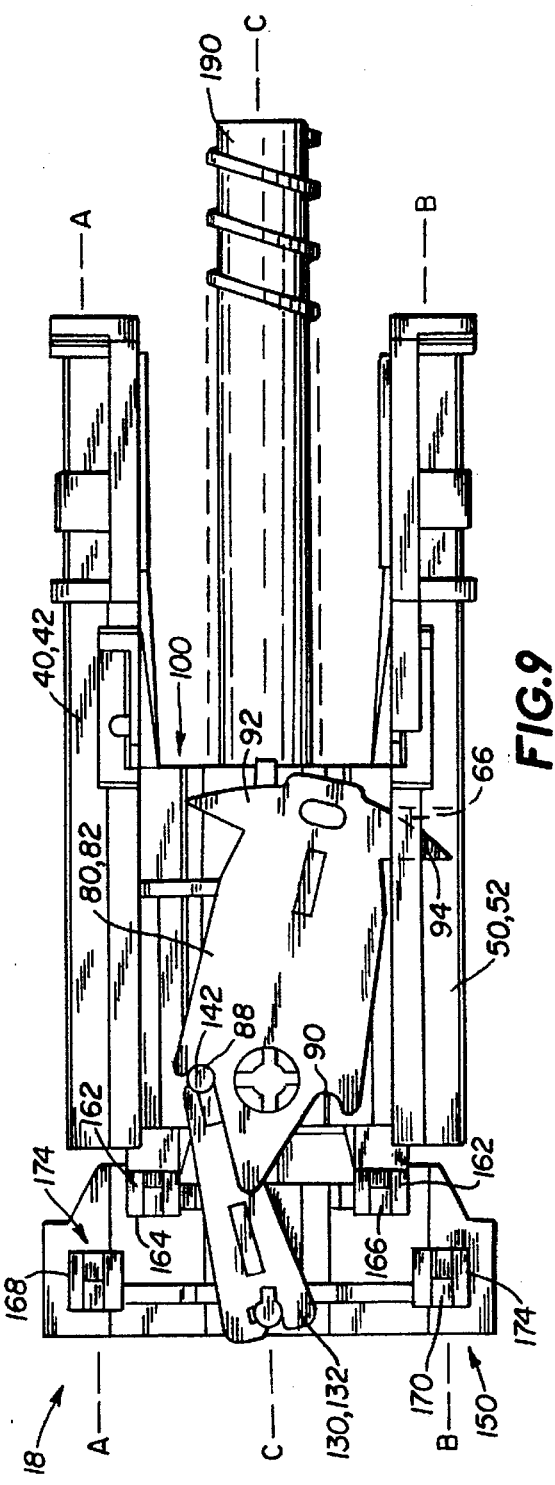

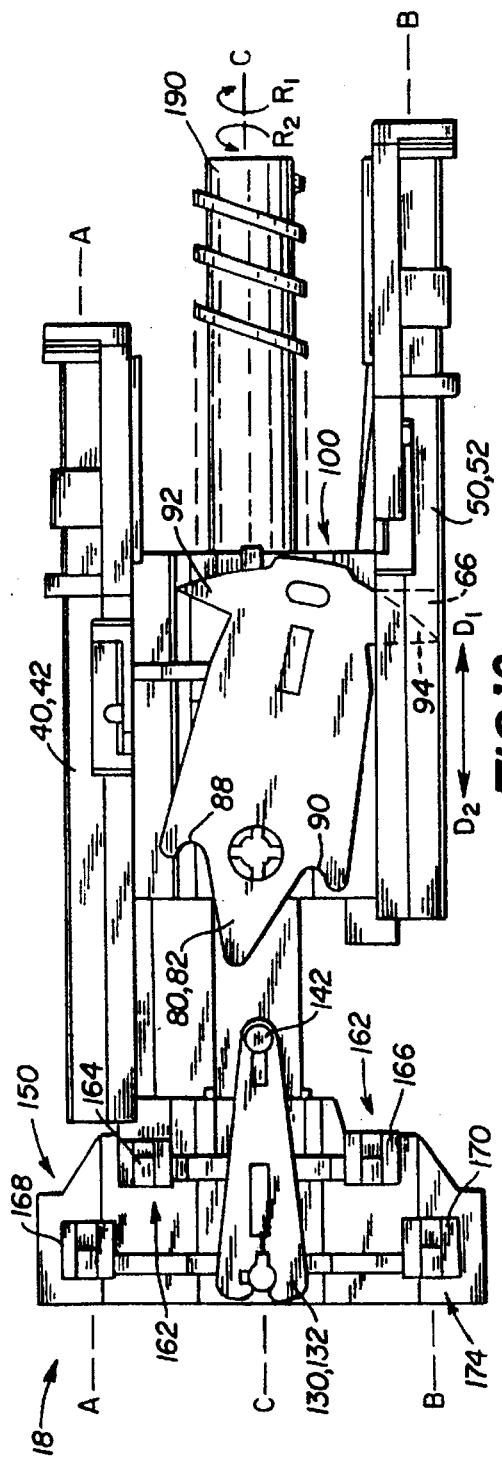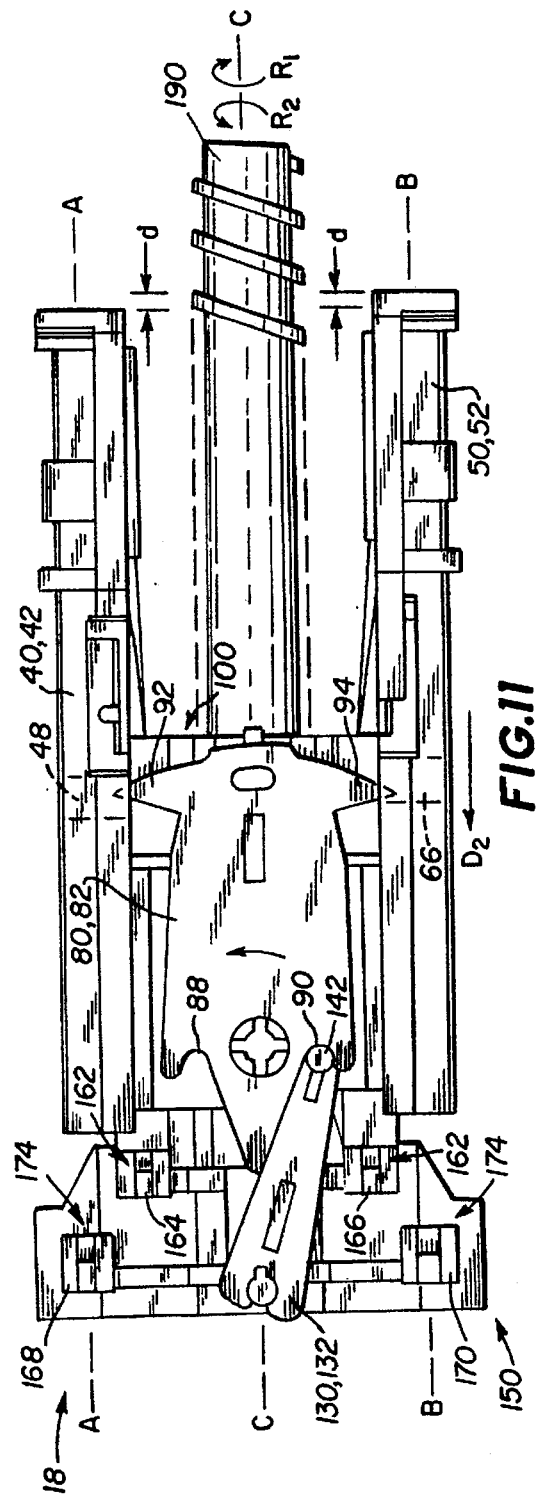

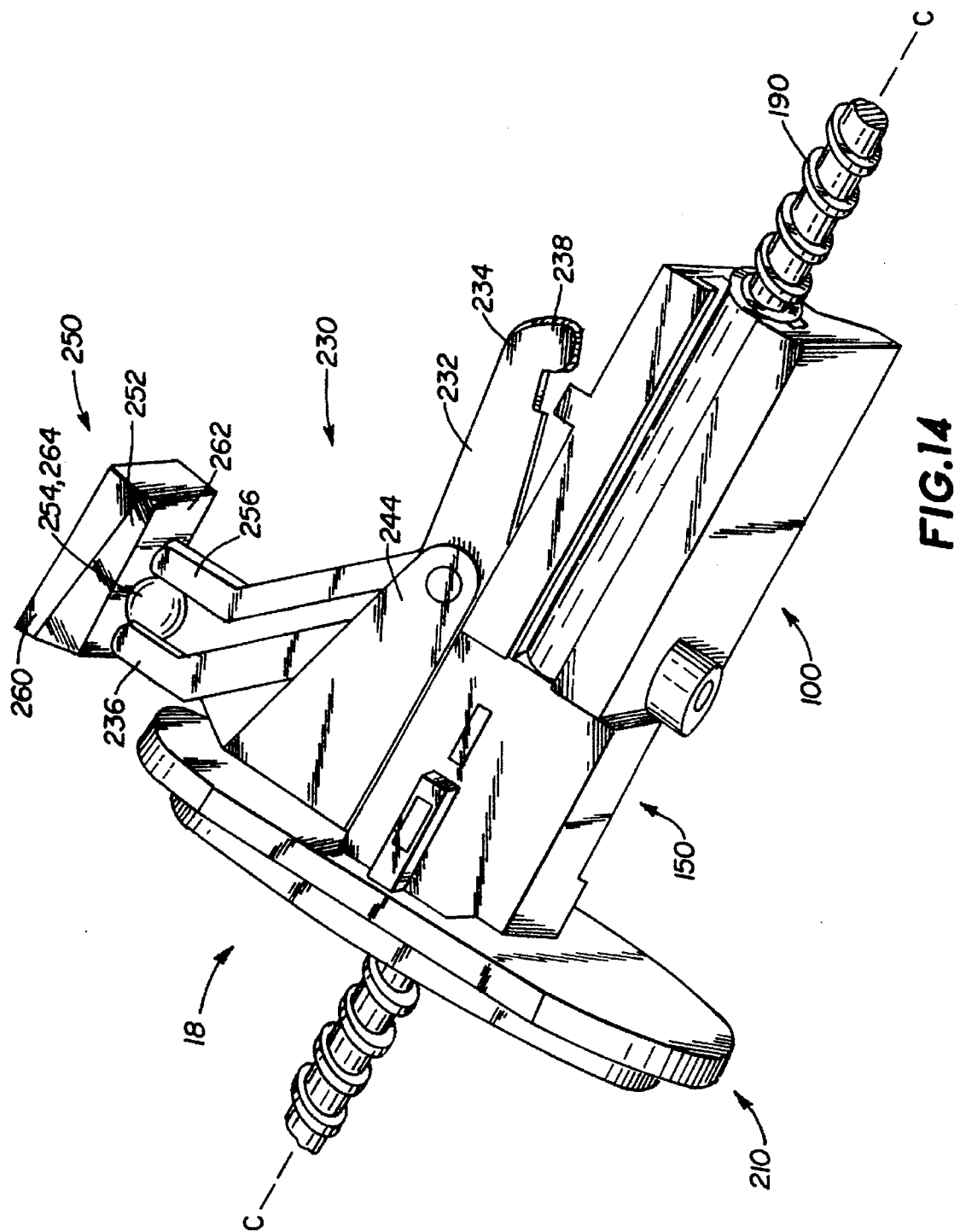

CARTRIDGE HANDLING SYSTEM WITH DUAL CARTRIDGE ENGAGING ASSEMBLY

CROSS REFERENCE TO RELATED APPLICATION

This is a continuation of application Ser. No. 08/135,607 filed on Oct. 12, 1993, now abandoned.

BACKGROUND OF THE INVENTION

The present invention relates generally to a system for handling and storing optical disk or tape cartridges and, more particularly, to an cartridge handling system which is capable of alternatingly handling two optical disk or tape cartridges in a dual cartridge engaging assembly.

An optical disk is a data storage medium which is readable by a laser-based reading device. Optical disks such as "compact disks" ("CDs") are commonly used for storing musical and audio-visual works. Furthermore, due to the huge storage capacity of optical disks as compared to conventional magnetic storage media, optical disks have become increasingly popular for use in the computer industry. To increase storage capacity, such optical disks may have the ability to store data on both sides of the disk.

For purposes of storing and handling the disks, optical disks may be mounted in parallelepiped-shaped cartridges. Also used in the computer industry for data storage are parallelepiped-shaped tape cartridges such as Digital Audio Tape (DAT) cartridges and 8-mm tape cartridges.

For large databases consisting of many disk or tape cartridges, it is necessary to provide a system for handling the cartridges. Various features and components of a cartridge handling system, as well as a cartridge engaging assembly in general, are disclosed in U.S. Pat. No. 4,998,232 dated Mar. 3, 1991 for OPTICAL DISK HANDLING APPARATUS WITH FLIP LATCH of Methlie et al.; U.S. Pat. No. 5,014,255 dated May 7, 1991 for OPTICAL DISK CARTRIDGE HANDLING APPARATUS WITH PASSIVE CARTRIDGE ENGAGEMENT ASSEMBLY of Wanger et al.; U.S. Pat. No. 5,010,536 dated Apr. 23, 1991 for CARTRIDGE HANDLING SYSTEM of Wanger et al.; U.S. Pat. No. 5,043,962 dated Aug. 27, 1991 for CARTRIDGE HANDLING SYSTEM of Wanger et al.; U.S. Pat. No. 5,062,093 dated Oct. 29, 1991 for OPTICAL DISK INSERTION APPARATUS of Christie et al.; U.S. Pat. No. 5,101,387 dated Mar. 31, 1992 for LATERAL DISPLACEMENT CONTROL ASSEMBLY FOR AN OPTICAL DISK HANDLING SYSTEM of Wanger et al.; U.S. Pat. No. 5,184,336 dated Feb. 2, 1993 for LATERAL DISPLACEMENT CONTROL ASSEMBLY FOR AN OPTICAL DISK HANDLING SYSTEM of Wanger et al.; and copending U.S. patent application Ser. No. 08/020,160 filed Feb. 18, 1993 for LINEAR DISPLACEMENT AND SUPPORT APPARATUS FOR USE IN A CARTRIDGE HANDLING SYSTEM of Luffel et al., which are each hereby specifically incorporated by reference for all that is disclosed therein.

In general, a cartridge handling system may include a cartridge storage system for storing the cartridges at corresponding storage locations. Such a system may also include a cartridge engaging assembly which may perform such functions as retrieving a desired cartridge from its corresponding storage location, transporting the cartridge to a disk or tape drive, and inserting the cartridge into the drive. A cartridge engaging assembly may also remove a cartridge from a drive, move the cartridge into alignment with its storage location, and return the cartridge to its storage location. It may also be necessary for the cartridge engaging assembly to flip a cartridge before insertion or reinsertion into a drive to reverse the side thereof which is read or written by the drive.

In order to increase the reliability and efficiency of a cartridge engaging assembly, it would be generally desirable to minimize the amount of displacement necessary to accomplish a given task. Thus, it would be desirable to provide a cartridge engaging assembly which can alternatingly handle more than one cartridge, i.e. a cartridge engaging assembly which can passively hold a first cartridge while actively engaging a second cartridge.

In order to decrease production and maintenance costs and increase reliability of the cartridge engaging assembly, it is also generally desirable to minimize the number of components in such an assembly. Specifically, it would be desirable for a cartridge engaging assembly which is capable of alternatingly handling two cartridges to be operable from a single drive unit.

SUMMARY OF THE INVENTION

The present invention may comprise a dual cartridge engaging assembly comprising first cartridge engaging means for engaging a first cartridge and displacing it along a first longitudinal cartridge displacement path. The assembly may also comprise second cartridge engaging means for engaging a second cartridge and displacing it along a second longitudinal cartridge displacement path parallel to the first cartridge displacement path. The assembly may also comprise unitary reversible drive means for providing mechanical energy to produce the longitudinal displacement of the first and second cartridge engaging means and to produce flipping displacement of the first and second cartridge engaging means about a central longitudinal axis parallel to the first cartridge displacement path. The assembly may further comprise passively switchable linkage means for transferring mechanical energy from the unitary reversible drive means to the first and second cartridge engaging means.

The present invention may also comprise a dual cartridge engaging assembly comprising first cartridge engaging means for engaging a cartridge and displacing it along a first longitudinal cartridge displacement path. The assembly may also comprise second cartridge engaging means substantially identical to the first cartridge engaging means for engaging a cartridge and displacing it along a second longitudinal cartridge displacement path. The assembly may also comprise toggle means for alternatingly engaging the first cartridge engaging means and the second cartridge engaging means. The assembly may also comprise first base means for mounting the toggle means, the first cartridge engaging means, and the second cartridge engaging means. The assembly may also comprise push bar means for guiding the toggle means into engagement with either the first cartridge engaging means or the second cartridge engaging means. The assembly may further comprise second base means for mounting the push bar means, and shaft means for displacing the first base means. The shaft means defines a central longitudinal axis which is parallel to the first and second longitudinal cartridge displacement paths. The assembly may further comprise drive means for providing reversible torque to the shaft means to rotatably drive the shaft means.

The dual cartridge engaging assembly of the present invention may also comprise a first engagement operating state wherein the toggle means is fixedly engaged with the first cartridge engaging means and the toggle means is disengaged from the second cartridge means. The assembly may further comprise a second engagement operating state wherein the toggle means is fixedly engaged with the second cartridge engaging means and the toggle means is disengaged from the first cartridge means. The assembly may further comprise a home operating mode wherein the first base means is in abutting engagement with the second base means, and the dual cartridge engaging assembly is in either the first engagement operating state or the second engagement operating state. The assembly may further comprise a cartridge displacement operating mode wherein the first base means is displaced along the central longitudinal axis, and the dual cartridge engaging assembly is in either the first engagement operating state or the second engagement operating state. The assembly may also comprise a first switch operating mode wherein the toggle means is released from the second engagement operating state and engaged into the first engagement operating state, and a second switch operating mode wherein the toggle means is released from the first engagement operating state and engaged into the second engagement operating state. The assembly may further comprise a flip operating mode wherein the first cartridge engaging means, the second cartridge engaging means, the first base means, the second base means, the toggle means, and the push bar means are flipped around the central longitudinal axis. The assembly may further comprise stationary third base means for providing an abutting surface against which the second base means is held during the flip operating mode. The assembly may further comprise park means for engaging the first base means prior to the assembly entering the flip operating mode.

The present invention may further comprise a method of linearly displacing a first cartridge engaging device and a second cartridge engaging device through reversible operation of a leadscrew, comprising: (a) longitudinally displacing the first cartridge displacement device in a first linear direction through rotation of the leadscrew in a first rotation direction; (b) longitudinally displacing the first cartridge displacement device in a second linear direction through rotation of the leadscrew in a second rotation direction; (c) passively disengaging the leadscrew from linear driving relationship with the first cartridge displacement device and engaging the leadscrew into linear driving relationship with the second cartridge engagement device through rotation of the leadscrew in the second rotation direction; (d) longitudinally displacing the second cartridge engagement device in the first linear direction through rotation of the leadscrew in the first rotation direction; (e) longitudinally displacing the second cartridge engagement device in the second linear direction through rotation of the leadscrew in the second rotation direction; and (f) passively disengaging the leadscrew from linear driving relationship with the second cartridge displacement device and engaging the leadscrew into linear driving relationship with the first cartridge engagement device through rotation of the leadscrew in the second rotation direction.

The present invention may further comprise a method of rotatingly displacing a first cartridge engaging device and a second cartridge engaging device through reversible operation of a leadscrew, comprising: (a) passively engaging a first base assembly by longitudinally displacing the first base assembly and a second base assembly through rotation of the leadscrew in a first rotation direction; (b) rotatingly displacing the first base assembly, the second base assembly, the first cartridge engaging device, and the second cartridge engaging device through rotation of the leadscrew in the first rotation direction; and (c) passively disengaging the first base assembly by longitudinally displacing the first base assembly and the second base assembly through rotation of the leadscrew in a second rotation direction.

BRIEF DESCRIPTION OF THE DRAWINGS

An illustrative and presently preferred embodiment of the invention is shown in the accompanying drawings in which:

FIG. 8 is a left elevation view of the dual cartridge engaging assembly in the home operating mode and the first engagement operating state.

FIG. 9 is a left elevation view of the dual cartridge engaging assembly in the home operating mode and the second engagement operating state.

FIG. 10 is a left elevation view of the dual cartridge engaging assembly in the cartridge displacement operating mode.

FIG. 11 is a left elevation view of the dual cartridge engaging assembly in the first switch operating mode.

FIG. 14 is a perspective view of the dual cartridge engaging assembly of FIG. 13 in any operating mode other than the flip operating mode.

DETAILED DESCRIPTION OF THE INVENTION

Cartridge Handling System In General

Figure 1:
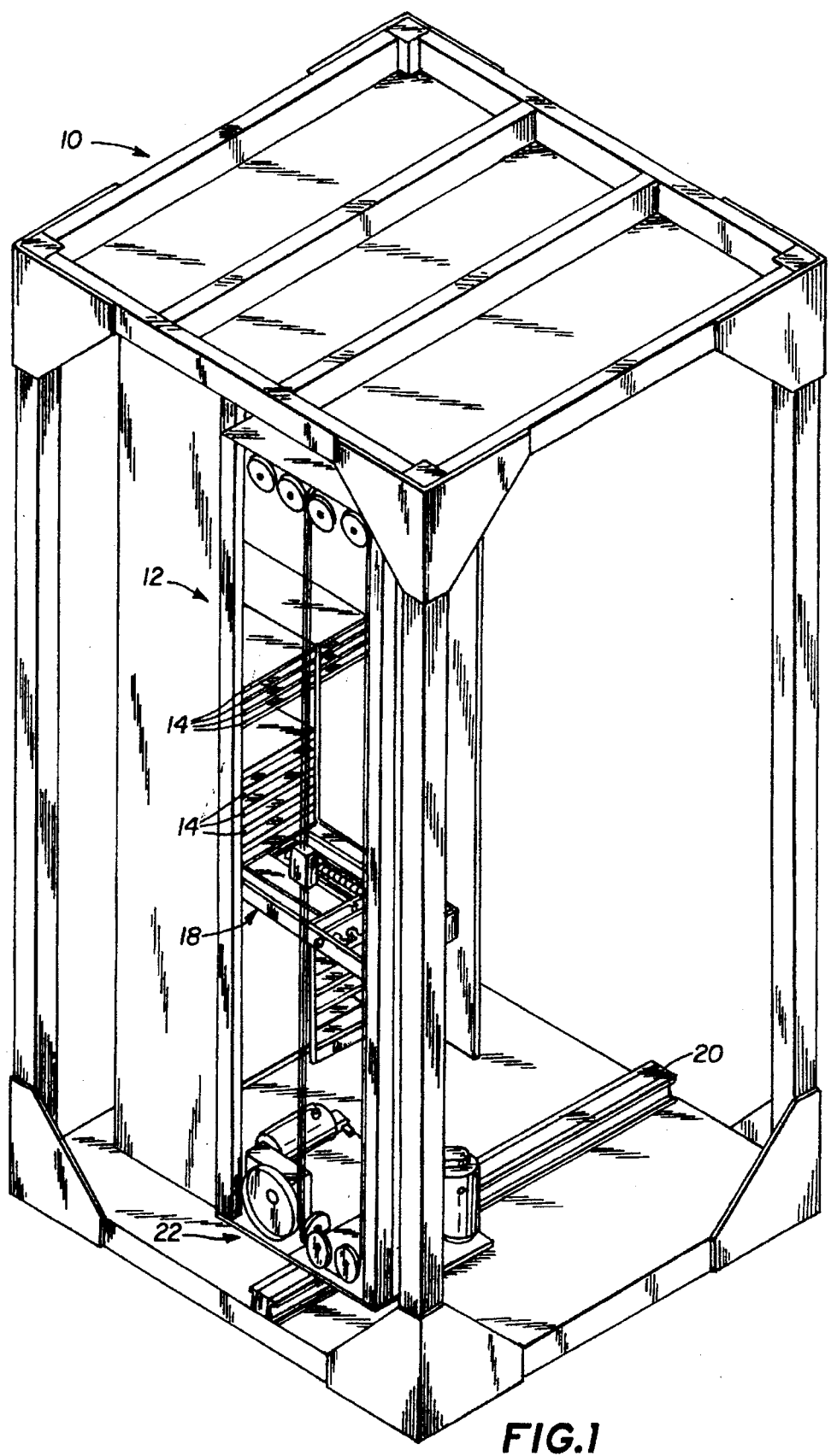
FIG. 1 is a front, left, top, schematic perspective view of a cartridge handling system utilizing the dual cartridge engaging assembly of the present invention.

FIG. 1 illustrates a cartridge handling system 10, which may comprise a cartridge storage system 12 for storing a plurality of cartridges (e.g. 14) at a plurality of corresponding storage locations. The cartridge handling system 10 may also comprise a dual cartridge engaging assembly 18, described in further detail below. In general, the cartridge engaging assembly 18 may perform such functions as retrieving a cartridge (e.g. 14) from its corresponding storage location, transporting the cartridge 14 to a drive 16, inserting the cartridge 14 into the drive 16, removing the cartridge 14 from the drive 16, and returning the cartridge 14 to its storage location. The cartridge engaging assembly 18 may also flip a cartridge 14 prior to insertion into a drive 16 to reverse the side thereof which is to be read or written by the drive 16.

The cartridge handling system 10 may further comprise a horizontal displacement assembly 20 for linearly, horizontally displacing the cartridge engaging assembly 18 and the cartridge 14 engaged thereby. The cartridge handling system 10 may further comprise a vertical displacement assembly 22 for linearly, vertically displacing the cartridge engaging assembly 18 and the cartridge 14 engaged thereby.

Dual Cartridge Engaging Assembly In General

Figure 2:
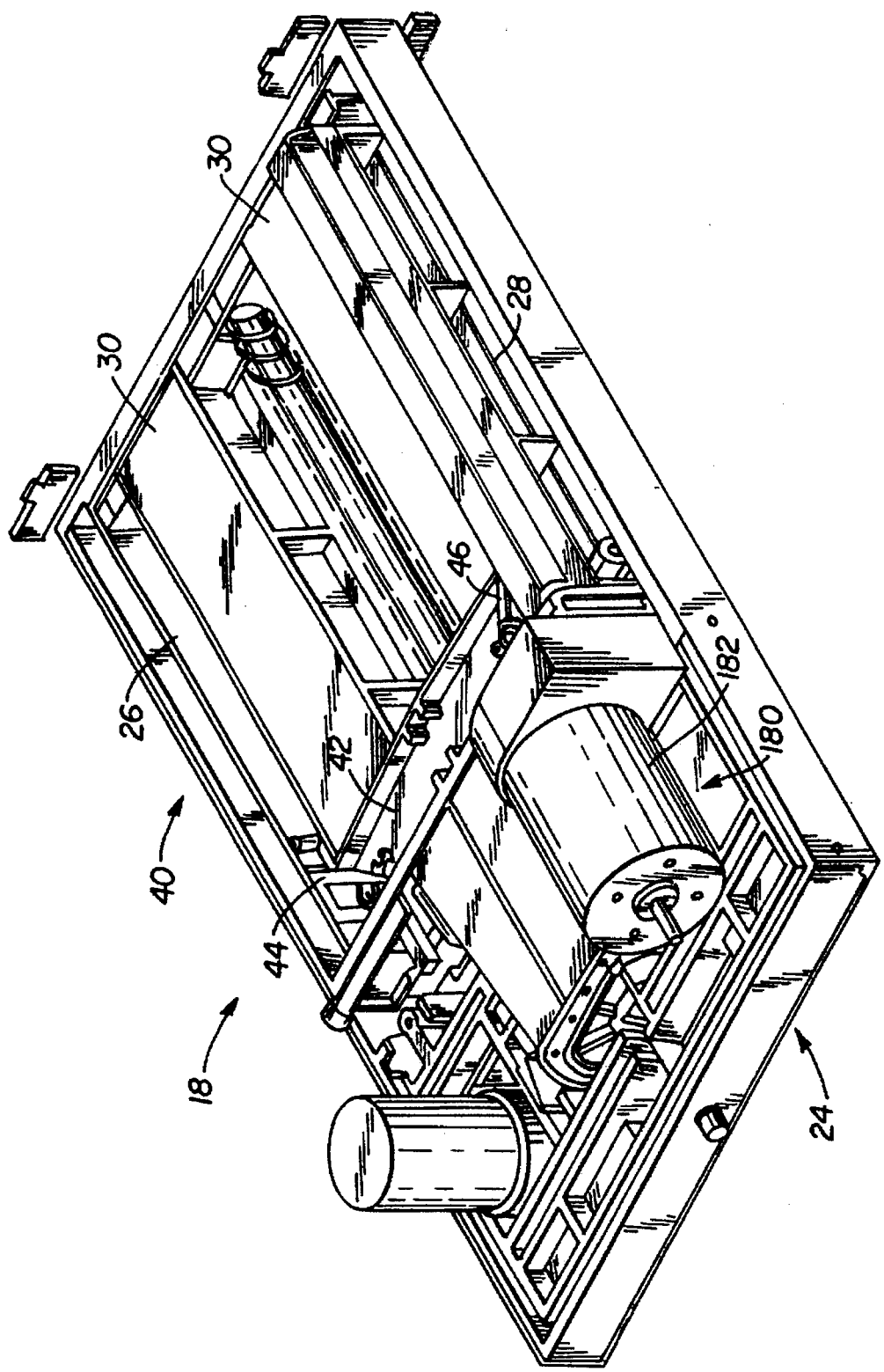
FIG. 2 is a rear, left, top perspective view of the dual cartridge engaging assembly of the present invention.
Figure 3:
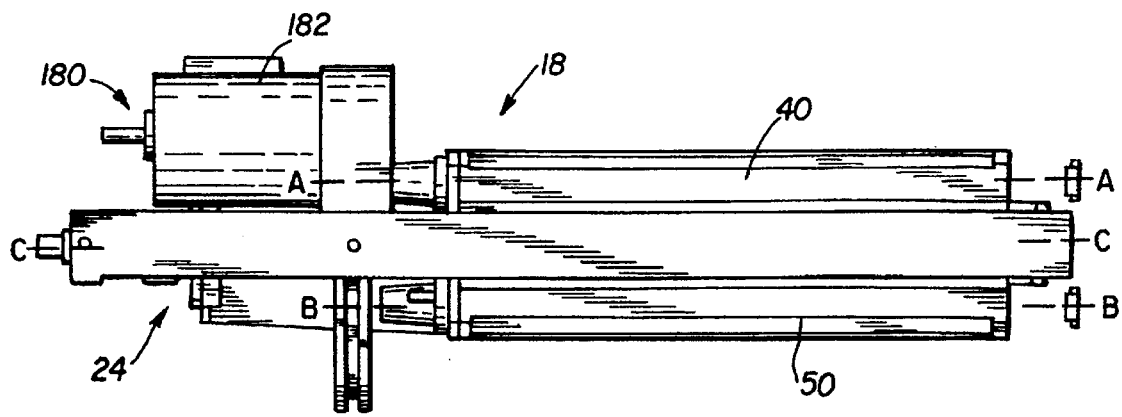
FIG. 3 is a left elevation view of the dual cartridge engaging assembly of FIG. 2.

As shown in FIGS. 2 and 3, the dual cartridge engaging assembly 18, which may be mounted in a housing 24, may comprise a first cartridge engaging means 40 for engaging a cartridge (e.g. 14, FIG. 1) and displacing the cartridge along a first longitudinal cartridge displacement path AA. The dual cartridge engaging assembly 18 may also comprise a second cartridge engaging means 50, which may be substantially identical to the first cartridge engaging means 40, for engaging a cartridge (e.g. 14, FIG. 1) and displacing the cartridge along a second longitudinal cartridge displacement path BB. The second cartridge engaging means 50 is preferably positioned directly opposite to and is spaced apart from the first cartridge engaging means 40.

The dual cartridge engaging assembly 18 may further comprise a unitary reversible drive means 180 for providing reversible torque to a shaft means 190 to rotatably drive the shaft means 190.

Figure 4:
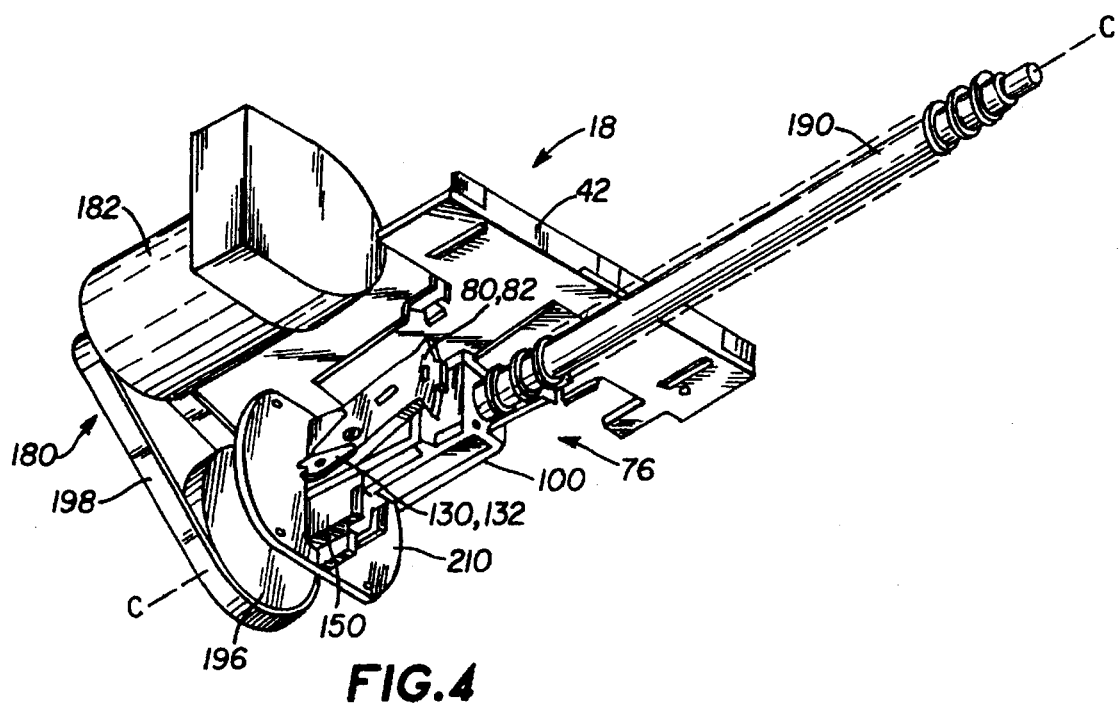
FIG. 4 is a front, left, bottom perspective view of the dual cartridge engaging assembly of FIGS. 2 and 3 with the housing removed.
Figure 5:
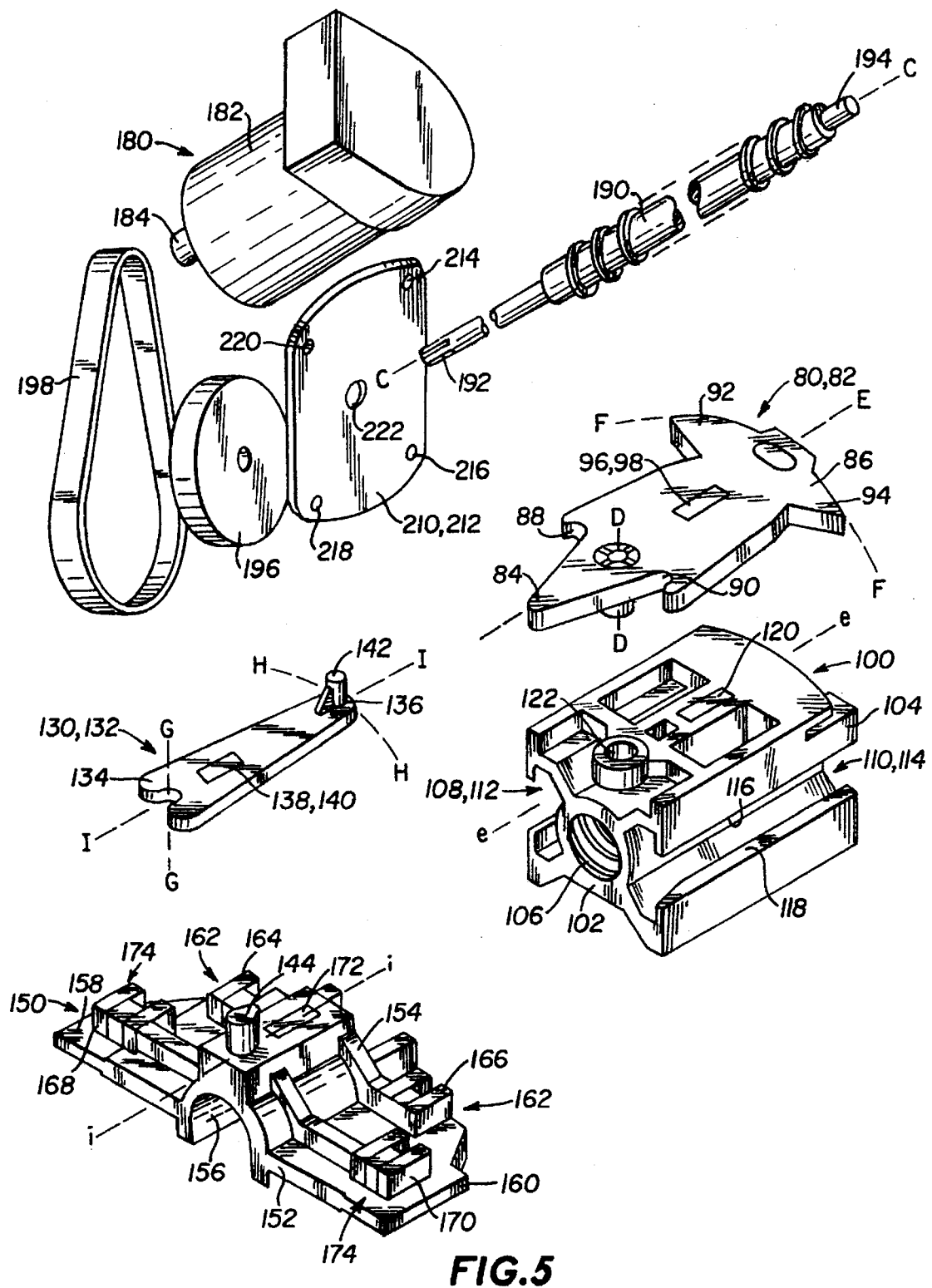
FIG. 5 is an exploded view of the dual cartridge engaging assembly of FIG. 4.

As shown in FIGS. 4 and 5, the dual cartridge engaging assembly 18 may also comprise a passively switchable linkage means 76 for transferring mechanical energy from the unitary reversible drive means 180 to the first and second cartridge engaging means 40, 50.

The linkage means 76 may comprise a toggle means 80 for alternatingly, holdingly engaging the first cartridge engaging means 40 and the second cartridge engaging means 50.

The linkage means 76 may also comprise a displaceable first base means 100 for pivotally mounting the toggle means 80 and slidably mounting the first cartridge engaging means 40 and the second cartridge engaging means 50. The first base means 100 may comprise a threaded bore 106 which is screwingly engagable with the threaded shaft means 190. Rotation of the shaft means 190 causes linear displacement of the first base means 100 along a central longitudinal axis CC.

The linkage means 76 may further comprise a push bar means 130 for guiding the toggle means 80 into alternating engagement with the first cartridge engaging means 40 and the second cartridge engaging means 50. The linkage means 76 may also include a displaceable second base means 150 for mounting the push bar means 129. The second base means 150 may comprise a substantially smooth bore 156 which slidingly receives the shaft means 190.

Figure 6:
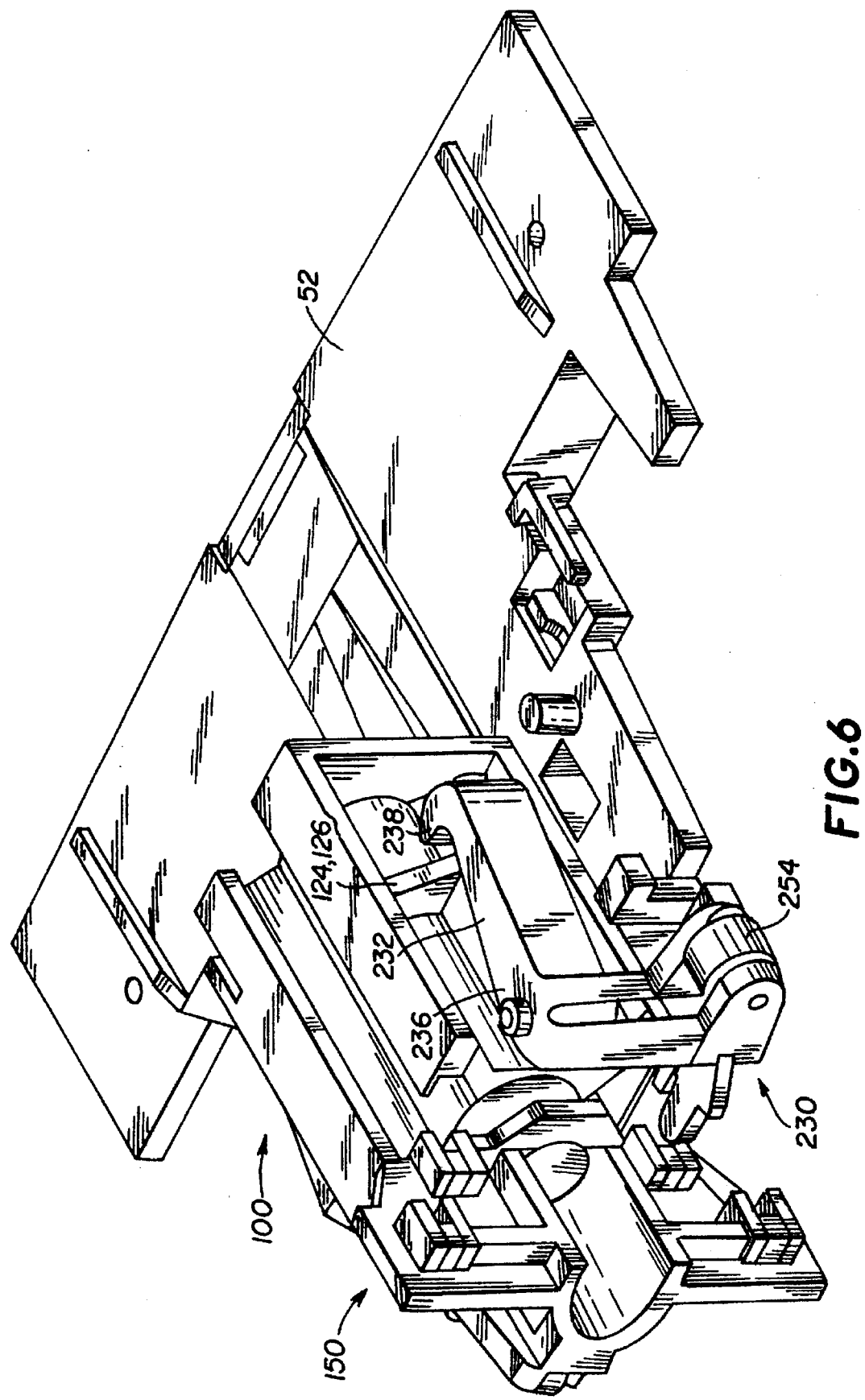
FIG. 6 is a rear, right, bottom perspective view of the dual cartridge engaging assembly of FIGS. 4 and 5 with components removed for clarity.

The dual cartridge engaging assembly 18 may further comprise a stationary third base means 210 for providing an abutting surface against which the second base means 150 is held during a flip operating mode, which is described in further detail below. As illustrated in FIG. 6, the assembly 18 may further comprise a park means 230 for engaging the first base means 100 prior to flipping a cartridge (e.g. 14, FIG. 1) in the flip operating mode.

Operation In General

As illustrated in FIGS. 8 and 9, the dual cartridge engaging assembly 18 may comprise a home operating mode wherein the displaceable first base means 100 is in abutting engagement with the displaceable second base means 150. In the home operating mode, the dual cartridge engaging assembly 18 may be in either a first engagement operating state, FIG. 8, or a second engagement operating state, FIG. 9. In the first engagement operating state as illustrated in FIG. 8, the toggle means 80 is engaged with the first cartridge engaging means 40 and disengaged from the second cartridge engaging means 50. In the second engagement operating state as illustrated in FIG. 9, the toggle means 80 is engaged with the second cartridge engaging means 50 and disengaged from the first cartridge engaging means 40.

The dual cartridge engaging assembly 18 may also comprise a cartridge displacement operating mode wherein the dual cartridge engaging assembly 18 may be in either the first engagement operating state (not shown) or the second engagement operating state, FIG. 10. As shown in FIG. 10, a cartridge 14 engaged by the second cartridge engaging means 50 may be displaced along the second longitudinal cartridge displacement path BB.

As illustrated in FIG. 11, the dual cartridge engaging assembly 18 may also comprise a first switch operating mode wherein the toggle means 80 is released from the second engagement operating state and engaged into the first engagement operating state.

Figure 12:
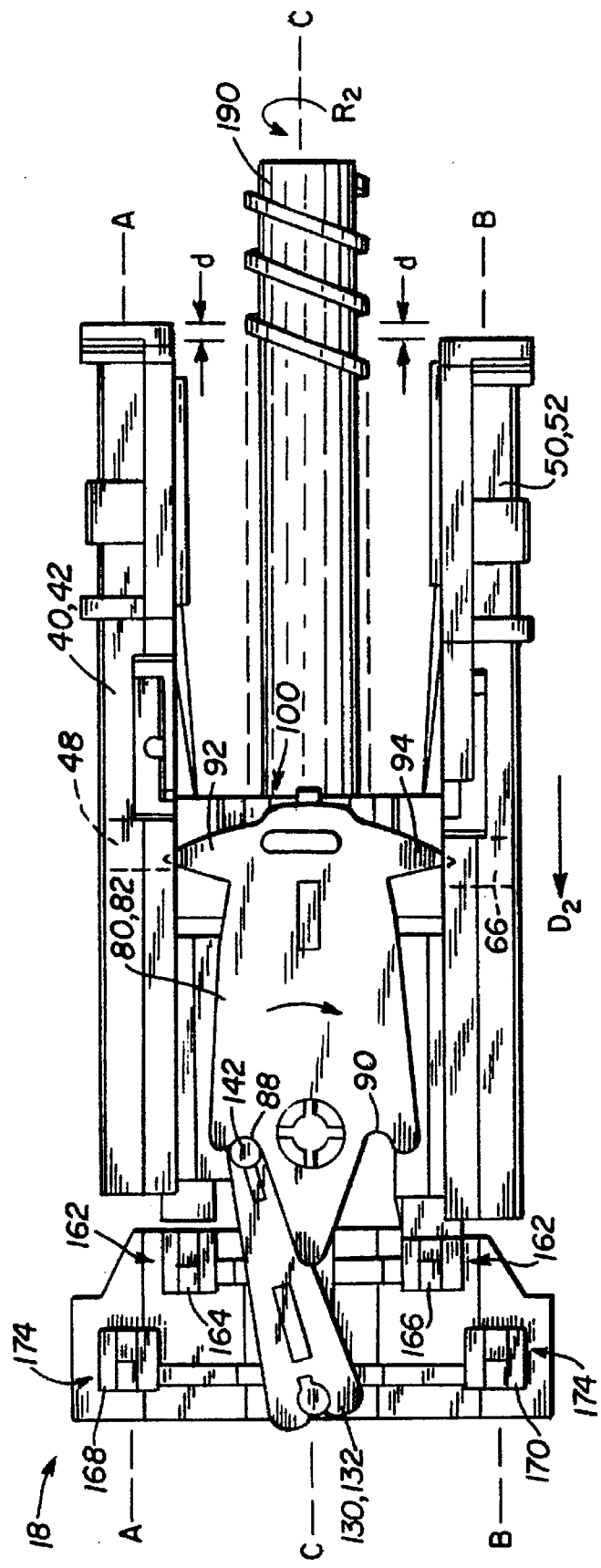
FIG. 12 is a left elevation view of the dual cartridge engaging assembly in the second switch operating mode.

As illustrated in FIG. 12, the dual cartridge engaging assembly 18 may also comprise a second switch operating mode wherein the toggle means 80 is released from the first engagement operating state and engaged into the second engagement operating state.

During the home operating mode (FIGS. 8 and 9), the cartridge displacement operating mode (FIG. 10), the first switch operating mode (FIG. 11), or the second switch operating mode (FIG. 12), the first base means 100 is linearly displaceable along the central longitudinal axis CC through rotation of the threaded shaft means 90.

Figure 13:
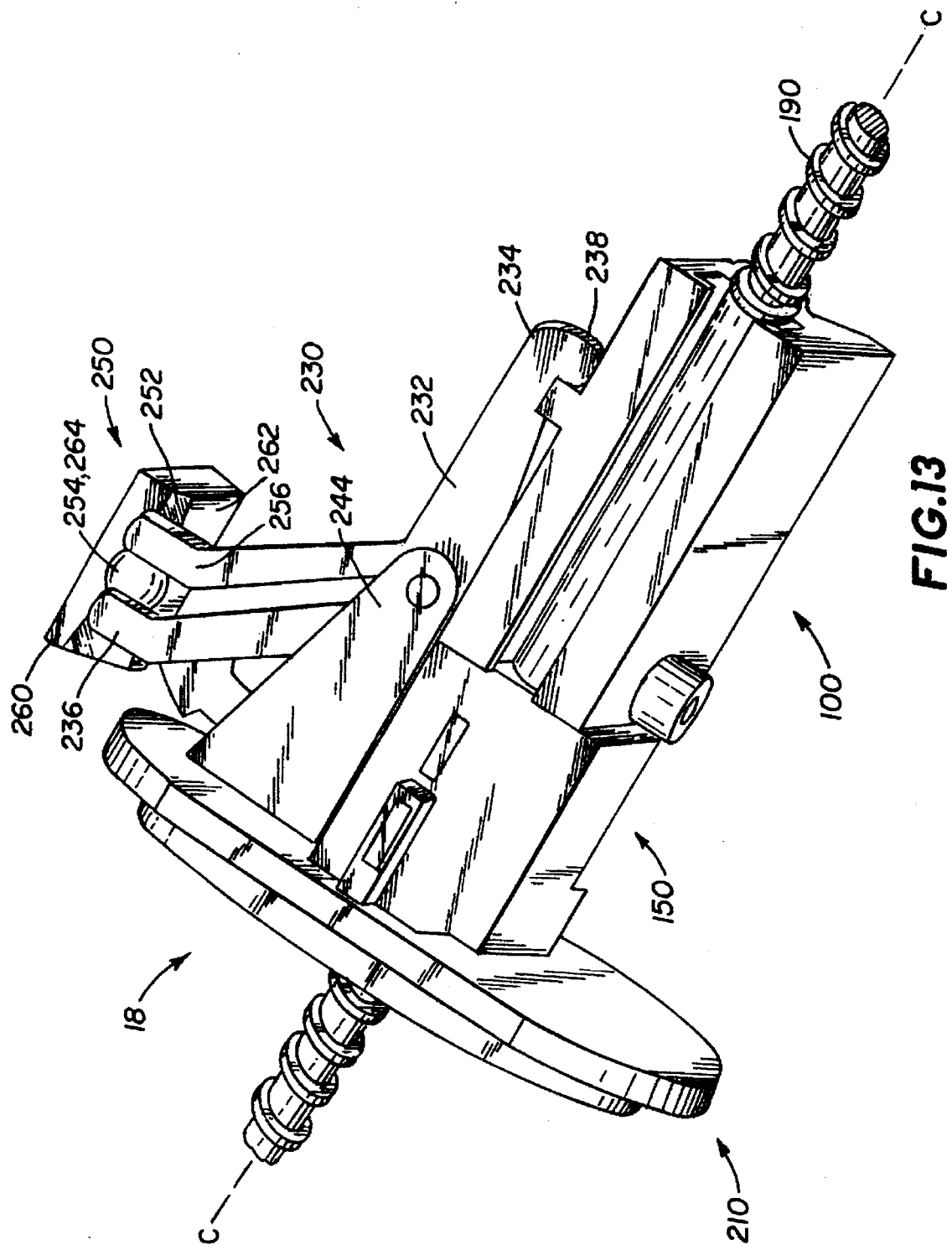
FIG. 13 is a perspective view of the dual cartridge engaging assembly in the flip operating mode, with components removed for clarity.

As illustrated in FIG. 13, the dual cartridge engaging assembly 18 may also comprise a flip operating mode. In the flip operating mode in the first engagement operating state, the cartridge engaging assembly 18 and a cartridge (e.g. 14, FIG. 1) held by the first cartridge engaging means 40 (removed for clarity) are flipped around the central longitudinal axis CC to reverse the side of the cartridge to be read by a drive (e.g. 16, FIG. 1). In this mode, the second cartridge engaging means 50 (removed for clarity), the first base means 100, the second base means, the toggle means 80 (removed for clarity), and the push bar means 130 (removed for clarity) are also simultaneously flipped around the central longitudinal axis CC. The second cartridge engaging means 50 may be passively holding a cartridge during the flip operating mode in the first engagement operating state.

In the flip operating mode in the second engagement operating state, the cartridge engaging assembly 18 and a cartridge (e.g. 14, FIG. 1) held by the second cartridge engaging means 50 are similarly flipped to reverse the side of the cartridge to be read by a drive (e.g. 16, FIG. 1). In this mode, the first cartridge engaging means 40, the first base means 100, the second base means 150, the toggle means 80, and the push bar means 130 are also simultaneously flipped around the central longitudinal axis CC. The first cartridge engaging means 40 may be passively holding a cartridge during the flip operating mode in the second engagement operating state.

Housing

As shown in FIGS. 2 and 3, the dual cartridge engaging assembly 18 may be mounted in a housing 24 which may be constructed from polycarbonate.

The housing 24 may comprise a first interior cavity 26 which is adapted to receive the first cartridge engaging means 40, and a second interior cavity 28 which is adapted to receive the second cartridge engaging means 50. The first interior cavity 26 may comprise a substantially planar surface 30, with which the first cartridge engaging means 40 thumb member 42 is in sliding or rolling contact, as described in further detail below with respect to the cartridge engaging means. The second interior cavity 28 is preferably substantially identical to the first interior cavity 26 and may also comprise a substantially planar surface (not shown), with which the second cartridge engaging means 50 thumb member 52 is in sliding or rolling contact as described in further detail below.

Cartridge Engaging Means

As shown in FIGS. 2 and 3, the dual cartridge engaging assembly 18 may comprise a first cartridge engaging means 40 and a second cartridge engaging means 50. The second cartridge engaging means 50 is preferably positioned in spaced apart, parallel, mirror-image relationship to the first cartridge engaging means In a preferred embodiment, the first cartridge engaging means 40 and the second cartridge engaging means 50 are substantially identical, and thus it is to be understood that individual components of the first and second cartridge engaging means 40, 50 as described in further detail below are also preferably substantially identical.

As shown in FIG. 2, the first cartridge engaging means 40 may comprise a thumb member 42, a first latch member 44, and a second latch member 46. The first and second latch members 44, 46 may be mounted on the thumb member 42. The latch members 44, 46 may grasp a cartridge (e.g. 14, FIG. 1) and the thumb member 42 may abuttingly engage a cartridge (e.g. 14, FIG. 1) so as to guide it along the first longitudinal cartridge displacement path AA. Exemplary functions of the thumb and latch members 42, 44, 46 are described in detail in U.S. Pat. No. 5,014,255, which has been incorporated by reference.

The second cartridge engaging means 50 may comprise first and second latch members (not shown), which may be substantially identical to the latch members 42, 44 described above. The second cartridge engaging means 50 may also comprise a thumb member 52, FIG. 7, which will now be described in more detail. The thumb member 42, FIG. 4, of the first cartridge engaging means 40 is preferably substantially identical to the thumb member 52 described below.

Figure 7:
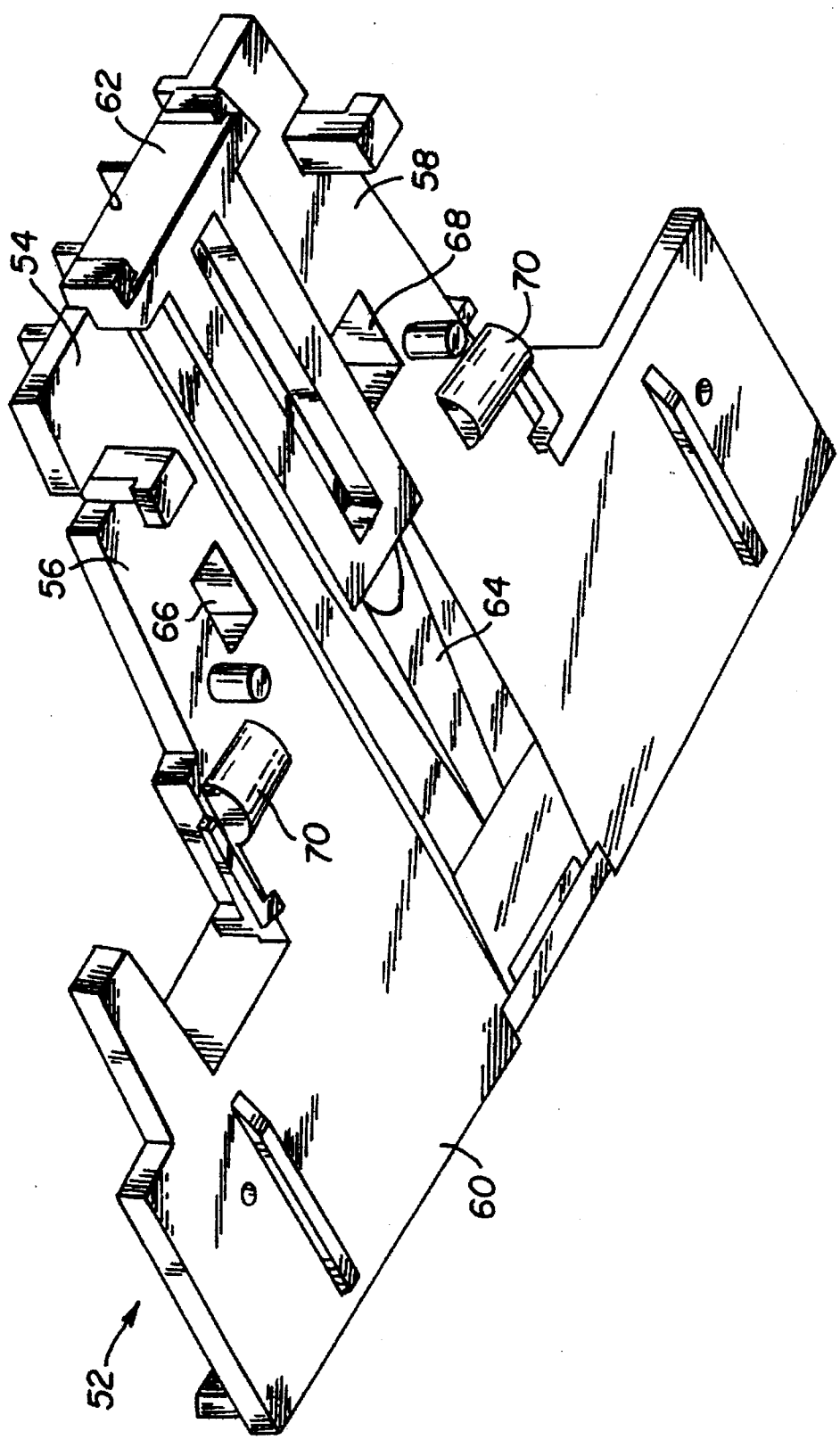
FIG. 7 is a detail view of the thumb member of the dual cartridge engaging assembly of the present invention.

Referring to FIG. 7, the thumb member 52 is preferably constructed from a high-strength material such as polycarbonate and may comprise a rear end portion 54, a first side portion 56, a second side portion 58, and a bottom surface 60. The second cartridge engaging means thumb member 52 may also comprise a plate member 62 positioned on the thumb member rear end portion 54 which is preferably constructed of a magnetically attractive material such as iron. The plate member 62 is preferably magnetically engagable with thumb attachment means 160 located on the second base means 130 as described in further detail below with respect to the second base means 130.

The thumb member 52 may further comprise a first bore 66 located on the thumb member first side portion 56 and a second bore 68 located on the thumb member second side portion 58. The first cartridge engaging means thumb member 42, FIG. 4, preferably also comprises first and second bores (e.g. 48, FIGS. 8–12) which are positioned directly opposite to the first and second bores 66, 68, respectively, of the second cartridge engaging means thumb member 42, FIG. 7. As described in further detail below with respect to the toggle means 80, the toggle means 80 may alternatingly engage the first bore 66 on the second cartridge engaging means thumb member 52, FIG. 7, and the first bore (e.g. 48, FIGS. 8–12) on the first cartridge engaging means thumb member 42, FIG. 4. Alternatively, the dual cartridge engaging assembly 18 could be modified so that the toggle means 80 engages the second bore 68 on the second cartridge engaging means thumb member 52, FIG. 7, and the second bore (not shown) on the first cartridge engaging means thumb member 42, FIG. 4.

As shown in FIG. 7, the thumb member 52 may further comprise a raised track portion 64 located on the thumb member bottom surface 60 which is slidingly engagable with the second channel portion 114 on the first base means 100.

The thumb member 52 may further comprise surface engagement means 70 for facilitating contact between the thumb member 52 bottom surface 60 and the housing interior cavity planar surface (e.g. 30, FIG. 2). In a preferred embodiment, the surface engagement means 70 is comprised of rollers or the like to minimize friction which may be caused by displacement of the thumb member bottom surface 60 along the housing interior cavity planar surface (e.g. 30, FIG. 2).

Toggle Means

As illustrated in FIGS. 4 and 5, the toggle means may comprise a toggle member 82 which is preferably constructed from a high-strength material such as polycarbonate.

The toggle member 82 may comprise a first end 84 and a second end 86. The toggle member first end 84 may be substantially V-shaped and may include a first, substantially U-shaped slot portion 88 and a second, substantially U-shaped slot portion 90. Each slot portion 88, 90 may receive the push bar means 130 as described in further detail below with regard to the push bar means 130. The toggle member 82 is preferably mounted at the toggle member first end 84 on a toggle mounting means 122 located on the first base means 100. The toggle member 82 and the toggle mounting means 122 are preferably "keyed" together in a manner well-known in the art. Positioned on the toggle mounting means 122, the toggle member 82 is rotatably, securely attached to the first base means 100 and is rotatable around a toggle means rotation axis DD.

The toggle member 82 second end 86 may comprise a first protruding member 92 and a second protruding member 94. The first protruding member 92 may be substantially V-shaped and is engagable with a bore (e.g. 48, FIGS. 8–12) located on the first cartridge engaging means thumb member 42. The second protruding portion 94 may also be substantially V-shaped and is engagable with a bore (e.g. 66, FIGS. 8–12) located on the second cartridge engaging means thumb member 52. The toggle member 82 second end 86 may be displaced along an arcuately-shaped toggle member rotation path FF, FIG. 5.

As shown in FIG. 5, the toggle mounting means 122 comprises a fixed toggle reference axis "ee" located on the first base means 100 which is parallel to the central longitudinal axis CC. The toggle member 82 itself comprises a toggle member axis EE and may further comprise a toggle member biasing means 96 for biasing the toggle member axis EE against alignment with the fixed toggle reference axis "ee". In a preferred embodiment, the toggle member biasing means 96 comprises a magnet 98 positioned on the toggle member 82 and a magnet 120 positioned on the first base means 100 directly below and in alignment with the magnet 120. Magnet 98 is positioned in alignment with the toggle member axis EE, and magnet 120 is positioned in alignment with the fixed toggle reference axis "ee". The magnets 98, 120 preferably have the same polarity and are thus repelled by one another so that the toggle member axis EE is biased against alignment with the fixed toggle reference axis "ee".

In an alternative embodiment, the toggle member biasing means 96 may comprise an elongate spring (not shown) or the like which may be fixedly connected at one end to the toggle member and at the other end to the first base means 100. The spring may have a natural length which is less than the length of the toggle member 92 so that the toggle member axis EE is biased against alignment with the fixed reference axis "ee".

Displaceable First Base Means

As illustrated in FIGS. 4 and 5, the displaceable first base means 100 is preferably constructed from a lightweight material such as nylon and may comprise a first end 102 and a second end 104. The first base means 100 may also comprise a threaded bore 106 extending from the first end 102 to the second end 104 and which is rotatably, threadingly engagable with a threaded shaft means 190.

The first base means 100 may also comprise a first mounting means 108 for mounting the first cartridge engaging means 40 and a second mounting means 110 for mounting the second cartridge engaging means 50. The first mounting means 108 may comprise a first recessed channel portion 112, and the second mounting means 110 may comprise a second recessed channel portion 114. Each channel portion 112, 114 preferably extends from the first base means first end 102 to the first base means second end 104. The second channel portion 114 is preferably diametrically opposite from the first channel portion 112.

The first cartridge engaging means thumb member 42 may be mounted on the first base means 100 within the first channel portion 112 as shown in FIG. 4, and the second cartridge engaging means thumb member 52 (FIG. 7) may be mounted directly oppositely to and in mirror-image relationship with the first cartridge engaging means thumb member 42 within the second channel portion 114. Specifically, the first cartridge engaging means thumb member 42 may be slidingly engagable with the first channel portion 112 on the first base means 100. The sliding engagement of the thumb member 42 within the first channel portion 112 defines the first longitudinal cartridge displacement path AA (FIG. 3) which is parallel to the central longitudinal axis CC. The second cartridge engaging means thumb member 52 (FIG. 7) may be slidingly engagable with the second channel portion 114 of the first base means 100. The sliding engagement of the second cartridge engaging means thumb member 52 (FIG. 7) within the second channel portion 114 defines the second longitudinal cartridge displacement path BB (FIG. 3) which is parallel to the central longitudinal axis CC.

Referring to FIG. 5, the second channel portion 114 on the first base means 100 will be described in more detail with the understanding that the first channel portion 112 is preferably substantially identical. The second channel portion 114 may comprise a first inwardly extending portion 116 and a second inwardly extending portion 118. The raised track portion 64 on the second cartridge engaging means thumb member 52 (FIG. 7) may be slidingly mounted within the second channel portion 114. The first and second inwardly extending portions 116, 118 are adapted to maintain the raised track portion 64 within the second channel portion 114 while the second cartridge engaging means 50 is in any orientation (e.g. upside down, sideways, etc.). The first cartridge engaging means thumb member 42 is similarly maintained within the first channel portion 112 while the first cartridge engaging means 40 is in any orientation.

The first base means 100 may also comprise a lever engagement means 124, FIG. 6, which may releasably engage a lever apparatus 232 located on the park means 230, which will be described in further detail below with respect to the park means 230.

Push Bar Means

As illustrated in FIGS. 4 and 5, the push bar means 130 may comprise a push bar member 132 which is preferably constructed from a high-strength material such as polycarbonate.

The push bar member 132 may comprise a first end 134 and a second end 136. The push bar member 132 may be mounted at the push bar member first end 134 to the displaceable second base means 150 on a push bar mounting means 144 located on the second base means 150. The push bar member 132 and the push bar mounting means 144 are preferably "keyed" together in a manner well-known in the art. Positioned on the push bar mounting means 144, the push bar member 132 is securely, rotatably attached to the second base means 150. The push bar member 132 is rotatable around the push bar rotation axis GG. With the push bar member 132 rotatably attached at the first end 134, the second end 136 of the push bar member 132 may be displaced along an arcuately-shaped push bar rotation path HH.

The push bar mounting means 144 comprises a fixed push bar reference axis "ii" which is parallel to the central longitudinal axis CC. The push bar member 132 itself comprises a push bar axis II and may further comprise a push bar biasing means 138 for biasing the push bar axis II toward maintaining alignment with the fixed push bar reference axis "ii". The push bar biasing means 138 is preferably comprised of a magnet 140 positioned on the push bar member 132 and a magnet 172 positioned on the second base means directly below the magnet 140. Magnet 140 is positioned in alignment with the push bar axis II, and magnet 172 is positioned in alignment with the fixed push bar reference axis "ii" Magnets 140, 172 preferably have opposite polarities and are thus attracted to one another so that the push bar axis II is biased toward maintaining alignment with the fixed push bar reference axis "ii". Alternatively, the push bar biasing means 138 may be comprised of a spring (not shown) or the like which biases the push bar axis II toward maintaining alignment with the fixed push bar reference axis "ii".

The push bar member second end 136 may comprise a substantially cylindrical projection portion 142 which may abuttingly, alternatingly engage the first and second slot portions 88, 90 of the toggle member 82. In operation, the push bar member second end 136 may be displaced along the push bar rotation path HH until the projection portion 142 engages the toggle member first or second slot portion 88, 90. This displacement moves the push bar axis II out of alignment with the fixed push bar reference axis "ii". When the push bar member 132 is disengaged from the toggle member first or second slot portion 88, 90, the push bar biasing means 138 urges the push bar axis II back into alignment with the fixed push bar reference axis "ii".

Displaceable Second Base Means

As illustrated in FIGS. 4 and 5, the displaceable second base means 150 is preferably constructed from a high-strength material such as polycarbonate and may comprise a first end 152 and a second end 154. The second base means 150 may also comprise a substantially smooth bore 156 extending from the first end 152 to the second end 154 which is slidingly engagable with the threaded shaft means 190.

The second base means 150 may also comprise a first guide member 158 and a second guide member 160, the second guide member 160 being positioned oppositely to the first guide member 158. The first and second guide members 158, 160 are slidingly engagable with slots (not shown) located in the housing (24, FIG. 2) to prevent rotation of the second base means 150 around the central longitudinal axis CC.

The second base means 150 may further comprise thumb attachment means 162 for releasably engaging the thumb members 42, 52 of the first and second cartridge engaging means 40, 50, respectively. The thumb attachment means 162 preferably comprises a plurality of, and preferably two, magnet portions 164, 166, FIG. 5. The magnetically attractive plate member 62 of the second cartridge engaging means thumb member 52, FIG. 7, may be engaged by a magnet portion 164. A magnetically attractive plate portion (not shown) located on the first cartridge engaging means thumb member 42 may also be engaged by a magnet portion 166. The second base means is longitudinally displaced along axis CC by applying torque to the shaft means 190 as described in further detail with regard to the flip operating mode.

Drive Means and Shaft Means

As illustrated in FIG. 5, the drive means 180 may comprise a motor 182, which may be, e.g., a Buehler Model 13.43. A drive pulley 184 may be operatively connected to the motor 182.

The threaded shaft means 190 defines the central longitudinal axis CC and may comprise a first end 192 and a second end 194. The threaded shaft means 190 may be comprised of a leadscrew with a length of, e.g., 300 mm, a diameter of, e.g., 12.7 mm, and a thread pitch of, e.g., 38 mm. A driven pulley 196 may be attached to the first end 192 of the shaft means 190.

In one embodiment of the present invention, the driven pulley 196 of the shaft means 190 and the drive pulley 184 of the drive means 180 have a 3:1 gear ratio. The driven pulley 196 and the drive pulley 184 may be operatively connected by a drive belt 198 or the like. It is to be understood that any suitable mechanical components, e.g., gears, may be used to connect the drive means motor 182 to the shaft means 190. The amount of torque provided by the motor 182 to rotationally displace the shaft means 190 may be regulated by a computer system (not shown) which may send appropriate control commands to the motor 182.

Stationary Third Base Means

As illustrated in FIGS. 4 and 5, the stationary third base means 210 provides an abutting surface against which the second base means 150 is held at predetermined intervals. The third base means 210 may comprise a substantially planar member 212 which may include mounting means 214, 216, 218, 220 for mounting the planar member 212 to the housing 24, FIG. 2. The third base means 210 may further comprise a substantially smooth bore 222 for slidingly receiving the shaft means 190.

Park Means

Referring to FIGS. 6, 13, and 14, the park means 230 may comprise a lever apparatus 232 rotatably mounted on a lever mounting means 244 which is fixedly attached to the third base means 210. The lever apparatus 232 is releasably engagable with a lever engagement means 124 mounted on the first base means 100. The lever engagement means 124 may be comprised of an extending portion 126 such as a shelf or the like. The lever apparatus 232 may be comprised of a first end 234 and a second end 236. The lever apparatus first end 234 may be comprised of a hooked portion 238 which may engage the extending portion 126 of the lever engagement means 124.

The lever apparatus second end 236 may comprise a lever biasing means (not shown) for maintaining the lever apparatus 232 in engagement with the lever engagement means 124. The lever biasing means may be comprised of magnets, springs, or the like.

As shown in FIGS. 13 and 14, the park means 230 may further comprise a lever guide means 250 for guiding the lever apparatus 232 into engagement with and out of engagement from the lever engagement means 124. The lever guide means 250 may comprise a ramp member 252 which may be mounted on the housing (24, FIG. 2), a ramp engaging means 254 positioned on the lever apparatus second end 236 for engaging the ramp member 252, and a mounting means 256 also positioned on the lever apparatus second end 236 for mounting the ramp engaging means 256.

As shown in FIGS. 13 and 14, the ramp member 252 may comprise an angled surface 260 and a substantially planar surface 262. The ramp engaging means 254 preferably comprises a roller member 264 or the like which may be securely, rotatably mounted on the mounting means 256. The mounting means 256 is preferably integrally attached to the lever apparatus 232 so that displacement of the mounting means 256 and the ramp engaging means 254 mounted thereon causes displacement of the lever apparatus 232. More specifically, when the ramp engaging means 254 is positioned on the ramp member angled surface 260 as shown in FIG. 13, the lever apparatus 232 is engaged with the lever engagement means 124. When the ramp engaging means 254 is positioned on the ramp member planar surface 260 as shown in FIG. 14, the lever apparatus is disengaged from the lever engagement means 124.

The park means 230 may also comprise a base biasing means 174 for maintaining the third base means 210 spaced apart from the second base means 150. The base biasing means 174 preferably comprises a plurality, and preferably two, magnet portions 168, 170 located on the second base means 150 as shown in FIG. 5. In the home operating mode, cartridge displacement operating mode, and first and second switch operating modes described in further detail below, the magnet portions 168, 170 are each attached to a magnetically attractive plate portion (not shown) located on the housing means 24, FIGS. 2 and 3. The plate portion is positioned on the housing means 24 so that the second base means 150 is maintained in spaced-apart relationship, e.g. approximately 4 mm, with the third base means 210. In these operating modes, the lever apparatus 182 is disengaged from the lever engagement means 138 as shown in FIG. 14.

In the flip operating mode described in further detail below, the magnet portions 168, 170 are releasably disengaged from the plate portion (not shown) on the housing means 24 through rotation of the shaft means 190. With continued rotation of the shaft means 190, the second base means 150 is urged against the third base means 210. The second base means 150 remains in abutting relationship with the third base means 210 throughout the flip operating mode. In this operating mode, the lever apparatus 182 is engaged with the lever engagement means 138 as shown in FIG. 13.

In an alternative embodiment, the base biasing means 174 may comprise a plurality of springs (not shown), each spring having a natural length of approximately 4 mm, mounted on the third base means 210 adjacent to the second base means 150. In the flip operating mode, the springs are fully compressed and the third base means 210 is directly adjacent to the second base means 150. In the home operating mode, the cartridge displacement operating mode, and the first and second switch operating modes, the springs are extended to their natural lengths and the third base means 210 is spaced apart approximately 4 mm from the second base means 150.

First Engagement Operating State

As illustrated in FIG. 8, the dual cartridge engaging assembly 18 may comprise a first engagement operating state. In the first engagement operating state, the toggle means 80 toggle member 82 is engaged with the thumb member 42 on the first cartridge engaging means 40, and the toggle means 80 toggle member 82 is disengaged from the thumb member 52 on the second cartridge engaging means 50. More specifically, in this operating state, the toggle member 82 first protruding member 92 extends completely through the bore 48 on the first cartridge engaging means thumb member 42. The toggle member 82 second protruding member 94 is spaced away from the second cartridge engaging means 50 thumb member 52.

In the first engagement operating state, the first cartridge engaging means 40 may be displaced along the first longitudinal cartridge displacement path AA as described in further detail below with regard to the cartridge displacement operating mode.

Second Engagement Operating State

As illustrated in FIG. 11, the dual cartridge engaging assembly 18 may comprise a second engagement operating state. In the second engagement operating state, the toggle means 80 toggle member 82 is engaged with the thumb member 52 on the second cartridge engaging means 50, and the toggle means 80 toggle member 82 is disengaged from the thumb member 42 on the first cartridge engaging means 40. More specifically, in this operating state, the toggle member 82 second protruding member 94 extends completely through the bore 66 on the second cartridge engaging means thumb member 52. The toggle member 82 first protruding member 92 is spaced away from the first cartridge engaging means 40 thumb member 42.

In the second engagement operating state, the second cartridge engaging means 50 may be displaced along the second longitudinal cartridge displacement path BB as described in further detail below with regard to the cartridge displacement operating mode.

Home Operating Mode

In the home operating mode, the dual cartridge engaging assembly 18 may be in either the first engagement operating state (FIG. 8) or the second engagement operating state (FIG. 9).

As shown in FIGS. 8 and 9, in the home operating mode, the first base means 100 is in abutting engagement with the second base means 150. Furthermore, the push bar member 132, which is mounted on the second base means 150, is in abutting engagement with the toggle member 82, which is mounted on the first base means 100. More specifically, in the home operating mode and the first engagement operating state (FIG. 8), the projection portion 142 of the push bar member 132 is in abutting engagement with the second slot portion 90 of the toggle member 82. In the home operating mode and the second engagement operating state (FIG. 9), the projection portion 142 of the push bar member 132 is in abutting engagement with the first slot portion 88 of the toggle member 82.

In this operating mode, both the first cartridge engaging means 40 thumb member 42 and the second cartridge engaging means 50 thumb member 52 are releasably attached to the thumb attachment means 162 which is mounted on the second base means 150.

From the home operating mode, the dual cartridge engaging assembly 18 can directly proceed into either the cartridge displacement operating mode (FIG. 10) or the flip operating mode (FIGS. 13 and 14).

Cartridge Displacement Operating Mode

FIG. 10 illustrates the dual cartridge engaging assembly 18 in the cartridge displacement operating mode. In this operating mode, the dual cartridge engaging assembly 18 may be in either the first engagement operating state or the second engagement operating state. FIG. 10 shows the dual cartridge engaging assembly 18 in the second engagement operating state, i.e., the operating state in which the toggle member 82 is fixedly engaged with the thumb member 52 on the second cartridge engaging means 50.

During the cartridge displacement operating mode shown in FIG. 10, the second cartridge engaging means 50 and a cartridge (e.g. 14, FIG. 1) engaged thereby may be displaced along the second longitudinal cartridge displacement path BB. More specifically, the first base means 100 and the toggle member 82 mounted thereon are linearly displaceable along the shaft means 190 in direction $D_1$ or $D_2$ through rotation of the shaft means 190 in rotation direction $R_1$ or $R_2$, respectively. Since the toggle member 82 is fixedly engaged with the second cartridge engagement means 50 as shown in FIG. 10, the second cartridge engagement means 50 is also linearly displaceable in direction $D_1$ or $D_2$ through rotation of the shaft means 190 in rotation direction $R_1$ or $R_2$, respectively.

When the first base means 100, the toggle member 82, and the second cartridge engagement means 50 are travelling in direction $D_1$, the cartridge engagement assembly 18 may be retrieving a cartridge (e.g. 14, FIG. 1) from its corresponding storage location, transporting a cartridge to its corresponding storage location, retrieving a cartridge from a drive (e.g. 16, FIG. 1), or transporting a cartridge to a drive. When the first base means 100, the toggle member 82, and the second cartridge engagement means 50 are travelling in direction $D_2$, the cartridge engagement assembly 18 is proceeding to the second switch operating mode described in further detail below.

First Switch Operating Mode

The first switch operating mode is illustrated in FIG. 11. The cartridge engaging assembly 18 enters the first switch operating mode directly from the cartridge displacement operating mode in the second engagement operating state.

In the first switch operating mode, the first base means 100, the toggle member 82, and the second cartridge engagement means 50 are travelling in direction $D_2$ through rotation of the shaft means 190 in rotation direction $R_2$. The toggle means 80 toggle member 82 is released from the second engagement operating state and engaged into the first engagement operating state as a result of the coaction of the toggle member 82 with the push bar member 132. Thus, in the first switch operating mode, the toggle member 82 is "switched" from the second engagement operating state to the first engagement operating state.

Second Switch Operating Mode

The second switch operating mode is illustrated in FIG. 12. The cartridge engaging assembly 18 enters the second switch operating mode directly from the cartridge displacement operating mode in the first engagement operating state.

In the second switch operating mode, the first base means 100, the toggle member 82, and the second cartridge engagement means 50 are travelling in direction $D_2$ through rotation of the shaft means 190 in rotation direction $R_2$. The toggle means 80 toggle member 82 is released from the first engagement operating state and engaged into the second engagement operating state as a result of the coaction between the toggle member 82 with the push bar member 132. Thus, in the second switch operating mode, the toggle member 82 is "switched" from the first engagement operating state to the second engagement operating state.

Flip Operating Mode

The flip operating mode is illustrated in FIG. 13. The cartridge engaging means 18 enters the flip operating mode directly from the home operating mode. When the cartridge engaging means is in the home operating mode, torque is applied by the drive means 180 to the shaft means 190 which causes the park means 230 to operatively engage the first base means 100. More specifically, torque applied to the shaft means 190 displaces the park means ramp engaging means 254 from the ramp member planar surface 262 to the ramp member angled surface 260, causing the hooked portion 238 of the lever apparatus 232 to engage the lever engagement means 124 located on the first base means 100. Continued torque applied to the shaft means 190 causes the first base means 100 to apply force to the second base means 150, and, consequently, the second base means 150 is urged against and abuttingly engages the third base means 210. Finally, adequate torque is applied to the shaft means 190 so that the cartridge engaging assembly 18 is rotatably displaced, or "flipped", 180° around the central longitudinal axis CC.

During the flip operating mode, the cartridge engaging assembly 18 may be engaged in either the first engagement operating state or the second engagement operating state. During the flip operating mode in the first engagement operating state, the cartridge engaging means and a cartridge (e.g. 14, FIG. 1) held by the first cartridge engaging means 40 are flipped around the central longitudinal axis CC to reverse the side of the cartridge to be read by a drive (e.g. 16, FIG. 1). In this mode, the second cartridge engaging means 50, the first base means 100, the second base means 150, the toggle means 80, and the push bar means 130 are also simultaneously flipped around the central longitudinal axis CC. The second cartridge engaging means 50 may be passively holding a cartridge during the flip operating mode in the first engagement operating state.

During the flip operating mode in the second engagement operating state, the cartridge engaging means and a cartridge (e.g. 14, FIG. 1) held by the second cartridge engaging means 50 are similarly flipped to reverse the side of the cartridge to be read by a drive (e.g. 16, FIG. 1). In this mode, the first cartridge engaging means 40, the first base means 100, the second base means 150, the toggle means 80, and the push bar means 130 are also simultaneously flipped around the central longitudinal axis CC. The first cartridge engaging means 40 may be passively holding a cartridge during the flip operating mode in the second engagement operating state.

After the cartridge engaging assembly 18 has completed the flipping sequence described above in the flip operating mode, the cartridge engaging assembly 18 returns to the home operating mode. Furthermore, the first and second cartridge engaging means 40, 50 switch positions in the flip operating mode. For example, if first cartridge engaging means 40 was positioned above the second cartridge engaging means 50 prior to the flip operating mode, the first cartridge engaging means 40 is positioned below the second engaging means 50 subsequent to the flip operating mode. In these new positions in the home operating mode, the first and second cartridge engaging means 40, 50 may proceed to the cartridge displacement operating mode or may return to the flip operating mode.

Exemplary Sequence of Operations

An exemplary sequence of operations will now be described in which a first and second cartridge (e.g. 14, FIG. 1) engaged by the first and second cartridge engagement means 40, 50, FIGS. 8–12, are retrieved from and inserted into a cartridge storage location and a disk drive (e.g. 16, FIG. 1). The second cartridge is flipped over before it is inserted into the disk drive.

In this sequence of operations, the dual cartridge engaging assembly 18 is initially in the home operating mode in the first engagement operating state as shown in FIG. 8. The dual cartridge engaging assembly 18 is displaced horizontally and/or vertically as described in U.S. patent application Ser. No. 08/020,160, incorporated by reference above, until the first cartridge engaging means 40 is aligned with a first cartridge (e.g. 14, FIG. 1) which is positioned within a corresponding cartridge storage location. Through rotation of the shaft means 190 in rotation direction $R_1$, the dual cartridge engaging assembly 18 proceeds to the cartridge displacement operating mode in the first engagement operating state (not shown, but see, e.g., FIG. 10). In this mode, the toggle means 80 is engaged with the first cartridge engaging means 40. The first cartridge engaging means 40 travels along the cartridge displacement path AA in direction $D_1$ until it reaches the first cartridge (e.g. 14, FIG. 1). In a manner described in U.S. Pat. No. 5,014,255 incorporated by reference above, the first cartridge engaging means 40 grasps the first cartridge (e.g. 14, FIG. 1) and removes it from its storage location. Through rotation of the shaft means 190 in rotation direction $R_2$, the first cartridge engaging means 40 and the first cartridge engaged thereby then travel back along the cartridge displacement path AA in direction $D_2$.

As shown in FIG. 12, when the first cartridge engaging means 40 is at a distance "d" from the position it occupies in the home operating mode (i.e. when the first cartridge engaging means 40 is misaligned a distance "d" from the second cartridge engaging means 50), the dual cartridge engaging assembly 18 enters into the second switch operating mode. In this operating mode, the toggle means 80 disengages from the first cartridge engaging means 40 and passively, operatively engages with the second cartridge engaging means 50. Through continued rotation of the shaft means 190 in rotation direction $R_2$, the first cartridge engaging means 40 simultaneously continues to travel along the cartridge displacement path AA in direction $D_2$ until the dual cartridge engaging assembly 18 enters into the home operating mode in the second engagement operating state as shown in FIG. 9.

The dual cartridge engaging assembly 18 is then displaced horizontally and/or vertically as described in U.S. patent application Ser. No. 08/020,160, incorporated by reference above, until the second cartridge engaging means 50 is aligned with a second cartridge (e.g. 14, FIG. 1) which is positioned within a corresponding cartridge storage location. Through rotation of the shaft means 190 in rotation direction $R_1$, the dual cartridge engaging assembly 18 may then proceed to the cartridge displacement operating mode in the second engagement operating state as shown in FIG. 10. In this mode, the toggle means 80 is engaged with the second cartridge engaging means 50. The second cartridge engaging means 50 travels along the cartridge displacement path BB in direction $D_1$ until it reaches the cartridge (e.g. 14, FIG. 1). In a manner described in U.S. Pat. No. 5,014,255 incorporated by reference above, the second cartridge engaging means 50 grasps the cartridge (e.g. 14, FIG. 1) and removes it from its storage location. Through rotation of the shaft means 190 in rotation direction $R_2$, the second cartridge engaging means 50 and the cartridge engaged thereby then travel back along the cartridge displacement path BB in direction $D_2$.

As shown in FIG. 11, when the second cartridge engaging means 50 is at a distance "d" from the position it occupies in the home operating mode (i.e. when the second cartridge engaging means 50 is misaligned a distance "d" from the first cartridge engaging means 40), the dual cartridge engaging assembly 18 enters into the first switch operating mode. In this operating mode, the toggle means 80 disengages from the second cartridge engaging means 50 and passively, operatively engages with the first cartridge engaging means 40. Through continued rotation of the shaft means 190 in rotation direction $R_2$, the second cartridge engaging means 50 simultaneously continues to travel along the cartridge displacement path BB in direction $D_2$ until the dual cartridge engaging assembly 18 enters into the home operating mode in the first engagement operating state as shown in FIG. 8. At this point in the sequence of operations, the first and second cartridge engaging means 40, 50, are holding a first and second cartridge (e.g. 14, FIG. 1), respectively.

The dual cartridge engaging assembly 18 is then displaced horizontally and/or vertically as described in U.S. patent application Ser. No. 08/020,160, incorporated by reference above, until the first cartridge engaging means 40 is aligned with a drive (e.g. 16, FIG. 1). With the toggle means 80 in operative engagement with the first cartridge engaging means 40, the shaft means 190 is rotated in rotation direction $R_1$ so that the first cartridge engaging means 40 and the first cartridge (e.g. 14, FIG. 1) held thereby are displaced along the cartridge displacement path AA in direction $D_1$ (not shown, but see, e.g., FIG. 10). At this point in the sequence of operations, the dual cartridge engaging assembly 18 is in the cartridge displacement operating mode in the first engagement operating state. Rotation of the shaft means 190 ceases when the first cartridge engaging means 40 and the first cartridge held thereby reach the drive (e.g. 16, FIG. 1). In a manner described in U.S. Pat. No. 5,014,255 incorporated by reference above, the first cartridge is then inserted into the drive. Through rotation of the shaft means 190 in rotation direction $R_2$, the first cartridge engaging means 40 travels back along the cartridge displacement path AA in direction $D_2$.

As shown in FIG. 12 and described above, when the first cartridge engaging means 40 is at a distance "d" from the position it occupies in the home operating mode, the dual cartridge engaging assembly 18 enters into the second switch operating mode. In this operating mode, the toggle means 80 disengages from the first cartridge engaging means 40 and passively, operatively engages with the second cartridge engaging means 50, which is holding a second cartridge. Through continued rotation of the shaft means 190 in rotation direction $R_2$, the dual cartridge engaging assembly 18 enters into the home operating mode in the second engagement operating state as shown in FIG. 9.

In the sequence of operations described herein, the second cartridge is flipped before it is inserted into a drive. For the dual cartridge engaging assembly 18 to enter into the flip operating mode illustrated in FIG. 13, the assembly 18 must initially be in the home operating mode. The shaft means 190 continues to rotate in rotation direction $R_2$ which causes continued displacement of the first base means 100 in direction $D_2$. The first base means 100, which is abuttingly engaged with the second base means 150 in the home operating mode, pushes against the second base means 150 which causes linear displacement of the second base means 150 in direction $D_2$. The second base means 150 abuttingly engages the third base means 210 while, simultaneously therewith, the lever apparatus 232 of the park means 230 engages the first base means 100. More specifically, in the home operating mode, the ramp engaging means 254 is positioned on the ramp member 252 planar surface 262 and the second base means 150 is spaced away, e.g. 4 mm, from the third base means 210. Displacement of the first base means 100 and second base means 150 as described above causes displacement of the ramp engaging means 254 from the ramp member planar surface 262 to the ramp member angled surface 260. Displacement of the ramp engaging means 254, which is integrally attached to the lever apparatus 232, causes linear displacement of the lever apparatus 232 so that the lever apparatus hooked portion 238 engages the extending portion 126 on the first base means 100. Thus, in the flip operating mode, the first base means 100 is abuttingly engaged with the second base means 150, the second base means 150 is abuttingly engaged with the third base means 210, and the park means 230 lever apparatus 232 is securely, releasably engaged with the first base means 100.

Continued rotational displacement of the shaft means 190 in rotation direction $R_2$ causes the dual cartridge engaging assembly 18 to be flipped around the central longitudinal axis CC in rotation direction $R_2$. Rotation of the shaft means 190 in rotation direction $R_2$ ceases when the dual cartridge engaging assembly 18 has been rotatably displaced 180° from its previous position. Simultaneously with flipping of the dual cartridge engaging assembly 18, the assembly 18 may be horizontally and/or vertically displaced until the second cartridge engaging means 50 is aligned with a drive (e.g. 16, FIG. 1).

The dual cartridge engaging assembly 18 then returns to the home operating mode in the second cartridge engagement operating state as shown in FIG. 9. More specifically, the shaft means 190 rotates in rotation direction $R_1$ which causes displacement of the ramp engaging means 254 from the ramp member angled surface 260 to the ramp member planar surface 262. Displacement of the ramp engaging means 254, which is integrally attached to the lever apparatus 232, and force provided by the lever biasing means (not shown), which biases the lever apparatus 232 against engagement with the first base means 100, cause linear displacement of the lever apparatus 232 so that the lever apparatus hooked portion 238 disengages from the extending portion 126 on the first base means 100. Continued rotation of the shaft means 190 in rotation direction $R_1$ causes the first base means to be linearly displaced in direction $D_1$ along the central longitudinal axis CC. As the first base means 100 is displaced in direction $D_1$, the base biasing means 174 provides force which causes displacement of the second base means 150 in direction $D_1$ until the second base means 150 is spaced apart, e.g. 4 mm, from the stationary third base means 210. The dual cartridge engaging assembly 18 is now in the home operating mode in the second engagement operating state as shown in FIG. 9 wherein the first base means 100 is abuttingly engaged with the second base means 150, the second base means 150 is spaced apart, e.g. 4 mm, from the stationary third base means 210, and the toggle means 80 is operatively engaged with the second cartridge engaging means 50.

As shown in FIG. 10, through continued rotation of the shaft means 190 in rotation direction $R_1$, the second cartridge engaging means 50 is displaced in direction $D_1$ along the cartridge displacement path BB until the second cartridge (e.g. 14, FIG. 1) held by the second cartridge engaging means 50 is inserted into the drive. The shaft means 190 is then rotated in rotation direction $R_2$ to displace the second cartridge engaging means 50 in direction $D_2$ along the cartridge displacement path BB until the second cartridge engaging means 50 is at a distance "d" from the position it occupies in the home operating mode (i.e. when the second cartridge engaging means 50 is misaligned a distance "d" from the first cartridge engaging means 40). At this position, the dual cartridge engaging assembly 18 enters into the first switch operating mode. In this operating mode, the toggle means 80 disengages from the second cartridge engaging means 50 and passively, operatively engages with the first cartridge engaging means 40. Through continued rotation of the shaft means 190 in rotation direction $R_2$, the second cartridge engaging means 50 simultaneously continues to travel along the cartridge displacement path BB in direction $D_2$ until the dual cartridge engaging assembly 18 enters into the home operating mode in the first engagement operating state as shown in FIG. 8.

It is to be understood that the sequence described above is merely exemplary, and the dual cartridge engaging assembly 18 may perform any sequence of operations which is consistent with the functions of the assembly 18 described herein. An important feature of the present invention is that the dual cartridge engaging assembly 18 may perform several operations simultaneously, e.g., the assembly 18 may be displaced vertically or horizontally while flipping.

Other Embodiments

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A dual cartridge engaging assembly comprising:
  a) first cartridge engaging means for engaging a first cartridge and displacing said first cartridge along a first longitudinal cartridge displacement path;
  b) second cartridge engaging means for engaging a second cartridge and displacing said second cartridge along a second longitudinal cartridge displacement path parallel to said first longitudinal cartridge displacement path;
  c) unitary reversible drive means operably connectable to said first and second cartridge engaging means for providing mechanical energy to produce said longitudinal displacement of said first and second cartridge engaging means and to produce flipping displacement of said first and second cartridge engaging means; and
  d) clutchless, passively switchable linkage means operably connected to said unitary reversible drive means for transferring mechanical energy from said unitary reversible drive means to said first and second cartridge engaging means, said linkage means comprising unitary toggle means for alternatingly engaging said first cartridge engaging means and said second cartridge engaging means.

2. A dual cartridge engaging assembly comprising:
  a) first cartridge engaging means for engaging a first cartridge and displacing said first cartridge along a first longitudinal cartridge displacement path;
  b) second cartridge engaging means for engaging a second cartridge and displacing said second cartridge along a second longitudinal cartridge displacement path parallel to said first longitudinal cartridge displacement path;
  c) unitary reversible drive means for providing mechanical energy to produce said longitudinal displacement of said first and second cartridge engaging means and to produce flipping displacement of said first and second cartridge engaging means; and
  d) clutchless, passively switchable linkage means for transferring mechanical energy from said unitary reversible drive means to said first and second cartridge engaging means, said linkage means comprising:
    i) unitary toggle means for alternatingly engaging said first cartridge engaging means and said second cartridge engaging means;
    ii) first base means for mounting said toggle means, said first cartridge engaging means, and said second cartridge engaging means;
    iii) unitary push bar means for guiding said toggle means into engagement with one of said first cartridge engaging means and said second cartridge engaging means;
    iv) second base means for mounting said push bar means;
    v) shaft means drivingly connected to said drive means for displacing said first base means and said second base means, said shaft means defining a central longitudinal axis.

3. The invention of claim 2, said toggle means comprising:
  a) a toggle member rotatably mounted to said first base means;
  b) a toggle reference axis located on said first base means which is parallel to said central longitudinal axis;
  c) a toggle member axis located on said toggle member which is parallel to said central longitudinal axis; and
  d) a toggle member biasing means for aligning said toggle member axis askew from said toggle reference axis.

4. The invention of claim 3, said toggle member comprising:
  a) a substantially V-shaped first end comprising a first slot portion and a second slot portion which are each engagable with said push bar means; and b) a second end comprising a first protruding member which is engagable with said first cartridge engaging means and a second protruding member which is engagable with said second cartridge engaging means.

5. The invention of claim 2, said first base means comprising:
   a) a first end and a second end, wherein a threaded bore extends through said first base means from said first end to said second end which receives said shaft means;
   b) first mounting means for slidingly mounting said first cartridge engaging means;
   c) second mounting means for slidingly mounting said second cartridge engaging means; and
   d) toggle mounting means for rotatably mounting said toggle means.

6. The invention of claim 2, said push bar means comprising:
   a) a push bar member comprising a first end which is rotatably mounted to said second base means and a second end which is engagable with said toggle means, said push bar first end comprising a push bar rotation axis which is perpendicular to said central longitudinal axis, and said push bar second end comprising a rotation path relative to said push bar rotation axis; and
   b) push bar biasing means for defining said rotation path of said push bar second end.

7. The invention of claim 2, said second base means comprising:
   a) a first end and a second end, wherein a bore extends through said second base means from said first end to said second end which receives said shaft means;
   b) push bar mounting means for rotatably mounting said push bar means; and
   c) thumb attachment means for releasably attaching at least one of said first cartridge engaging means and said second cartridge engaging means to said second base means.

8. A dual cartridge engaging assembly comprising:
   a) first cartridge engaging means for engaging a first cartridge and displacing said first cartridge along a first longitudinal cartridge displacement path;
   b) second cartridge engaging means for engaging a second cartridge and displacing said second cartridge along a second longitudinal cartridge displacement path parallel to said first longitudinal cartridge displacement path;
   c) unitary reversible drive means for providing mechanical energy to produce said longitudinal displacement of said first and second cartridge engaging means and to produce flipping displacement of said first and second cartridge engaging means about a central longitudinal axis parallel to said first and second longitudinal cartridge displacement paths;
   d) passively switchable linkage means for transferring mechanical energy from said unitary reversible drive means to said first and second cartridge engaging means, said linkage means comprising:
      i) toggle means for alternatingly engaging said first cartridge engaging means and said second cartridge engaging means;
      ii) first base means for mounting said toggle means, said first cartridge engaging means, and said second cartridge engaging means;
      iii) push bar means for guiding said toggle means into engagement with one of said first cartridge engaging means and said second cartridge engaging means;
      iv) second base means for mounting said push bar means; and
      v) shaft means drivingly connected to said drive means for displacing said first base means and said second base means, said shaft means defining said central longitudinal axis;
   e) a first engagement operating state wherein said toggle means is fixedly engaged with said first cartridge engaging means and said toggle means is disengaged from said second cartridge engaging means;
   f) a second engagement operating state wherein said toggle means is fixedly engaged with said second cartridge engaging means and said toggle means is disengaged from said first cartridge engaging means;
   g) a home operating mode wherein said first base means is in abutting engagement with said second base means, and said dual cartridge engaging assembly is in one of said first engagement operating state and said second engagement operating state;
   h) a cartridge displacement operating mode wherein said dual cartridge engaging assembly is in one of said first engagement operating state and said second engagement operating state;
   i) a first switch operating mode wherein said toggle means is released from said second engagement operating state and engaged into said first engagement operating state;
   j) a second switch operating mode wherein said toggle means is released from said first engagement operating state and engaged into said second engagement operating state; and
   k) wherein said first base means is linearly displaceable along said central longitudinal axis during each of said cartridge displacement operating mode, said first switch operating mode, and said second switch operating mode.

9. The invention of claim 8, said dual cartridge engaging assembly further comprising:
   a flip operating mode wherein said first cartridge engaging means, said second cartridge engaging means, said first base means, said second base means, said toggle means, and said push bar means are flipped around said central longitudinal axis.

10. The invention of claim 9, said dual cartridge engaging assembly further comprising:
    a) stationary third base means for providing an abutting surface against which said second base means is held during said flip operating mode; and
    b) park means for engaging said first base means prior to said dual cartridge engaging assembly entering into said flip operating mode.

11. The invention of claim 10, said park means comprising:
    a) a lever apparatus attached to said third base means, said lever apparatus comprising a hooked portion;
    b) lever engagement means mounted on said first base means for releasably engaging said hooked portion of said lever apparatus;
    c) lever biasing means for maintaining said lever apparatus in engagement with said lever engagement means; and
    d) lever guide means for guiding said lever apparatus into engagement with and out of engagement from said lever engagement means.

12. The invention of claim 10, said dual cartridge engaging assembly further comprising:

base biasing means for maintaining said stationary third base means spaced apart from said second base means during said home operating mode, said cartridge displacement operating mode, said first switch operating mode, and said second switch operating mode;

wherein said base biasing means is inoperative during said flip operating mode so that said second base means abuts said stationary third base means during said flip operating mode.

13. The invention of claim 12, said base biasing means comprising:

at least one magnetically attractive plate portion located on a portion of said dual cartridge engaging assembly which is stationary relative to said second base means;

at least one magnet located on said second base means, wherein said at least one magnet is engaged with said at least one magnetically attractive plate portion during said home operating mode, said cartridge displacement operating mode, said first switch operating mode, and said second switch operating mode, and said at least one magnet is disengaged from said at least one magnetically attractive plate portion during said flip operating mode.

14. A dual cartridge engaging assembly comprising:

a) first cartridge engaging means for engaging a cartridge and displacing said cartridge along a first longitudinal cartridge displacement path;

b) second cartridge engaging means substantially identical to said first cartridge engaging means for engaging a cartridge and displacing said cartridge along a second longitudinal cartridge displacement path;

c) toggle means for alternatingly engaging said first cartridge engaging means and said second cartridge engaging means to alternatingly transfer mechanical energy from a drive means to said first cartridge engaging means and said second cartridge engaging means;

d) first base means for mounting said toggle means, said first cartridge engaging means, and said second cartridge engaging means;

e) push bar means for guiding said toggle means into engagement with one of said first cartridge engaging means and said second cartridge engaging means;

f) second base means for mounting said push bar means;

g) shaft means for displacing said first base means, said shaft means defining a central longitudinal axis which is parallel to said first and second longitudinal cartridge displacement paths;

h) said drive means for providing reversible torque to said shaft means to rotatably drive said shaft means;

i) a first engagement operating state wherein said toggle means is fixedly engaged with said first cartridge engaging means and said toggle means is disengaged from said second cartridge engaging means;

j) a second engagement operating state wherein said toggle means is fixedly engaged with said second cartridge engaging means and said toggle means is disengaged from said first cartridge engaging means;

k) a home operating mode wherein said first base means is in abutting engagement with said second base means, and said dual cartridge engaging assembly is in one of said first engagement operating state and said second engagement operating state;

l) a cartridge displacement operating mode wherein said first base means is displaced along said central longitudinal axis, and said dual cartridge engaging assembly is in one of said first engagement operating state and said second engagement operating state;

m) a first switch operating mode wherein said toggle means is released from said second engagement operating state and engaged into said first engagement operating state;

n) a second switch operating mode wherein said toggle means is released from said first engagement operating state and engaged into said second engagement operating state;

o) a flip operating mode wherein said first cartridge engaging means, said second cartridge engaging means, said first base means, said second base means, said toggle means, and said push bar means are flipped around said central longitudinal axis;

p) stationary third base means for providing an abutting surface against which said second base means is held during said flip operating mode; and q) park means for engaging said first base means prior to said cartridge engaging assembly entering said flip operating mode.

15. A method of linearly displacing a first cartridge engaging device and a second cartridge engaging device through reversible operation of a threaded shaft, comprising:

a) longitudinally displacing said first cartridge engaging device in a first linear direction through rotation of said threaded shaft in a first rotation direction;

b) longitudinally displacing said first cartridge engaging device in a second linear direction through rotation of said threaded shaft in a second rotation direction;

c) passively disengaging said threaded shaft from linear driving relationship with said first cartridge engaging device and engaging said threaded shaft into linear driving relationship with said second cartridge engagement device through rotation of said threaded shaft in said second rotation direction;

d) longitudinally displacing said second cartridge engagement device in said first linear direction through rotation of said threaded shaft in said first rotation direction;

e) longitudinally displacing said second cartridge engagement device in said second linear direction through rotation of said threaded shaft in said second rotation direction; and f) passively disengaging said threaded shaft from linear driving relationship with said second cartridge engaging device and engaging said threaded shaft into linear driving relationship with said first cartridge engagement device through rotation of said threaded shaft in said second rotation direction.

16. A method of rotating a first cartridge engaging device and a second cartridge engaging device around a threaded shaft through reversible operation of said threaded shaft, comprising:

a) passively engaging a first cartridge engaging device and a second cartridge engaging device with a unitary reversible drive by longitudinally displacing a first base assembly and a second base assembly through rotation of a threaded shaft by said unitary reversible drive in a first rotation direction;

b) rotating said first base assembly, said second base assembly, said first cartridge engaging device, and said second cartridge engaging device around said threaded shaft through rotation of said threaded shaft by said unitary reversible drive in said first rotation direction; and c) passively disengaging said first cartridge engaging device and said second cartridge engaging device from said unitary reversible drive by longitudinally displacing said first base assembly and said second base assembly through rotation of said threaded shaft in a second rotation direction.

17. A dual cartridge engaging assembly comprising:

a) a first cartridge engaging device adapted to engage a first cartridge and displace said first cartridge along a first longitudinal cartridge displacement path;

b) a second cartridge engaging device adapted to engage a second cartridge and displace said second cartridge along a second longitudinal cartridge displacement path parallel to said first longitudinal cartridge displacement path;

c) a unitary reversible drive operably connectable to said first and second cartridge engaging devices which is constructed and arranged to provide mechanical energy to produce said longitudinal displacement of said first and second cartridge engaging devices and to produce flipping displacement of said first and second cartridge engaging devices; and d) a clutchless, passively switchable linkage assembly operably connected to said unitary reversible drive which is adapted to transfer mechanical energy from said unitary reversible drive to said first and second cartridge engaging devices, said linkage assembly comprising a unitary toggle adapted to alternatingly engage said first cartridge engaging device and said second cartridge engaging device.

18. A dual cartridge engaging assembly comprising:

a) a first cartridge engaging device adapted to engage a first cartridge and displace said first cartridge along a first longitudinal cartridge displacement path;

b) a second cartridge engaging device adapted to engage a second cartridge and displace said second cartridge along a second longitudinal cartridge displacement path parallel to said first longitudinal cartridge displacement path;

c) a unitary reversible drive constructed and arranged to provide mechanical energy to produce said longitudinal displacement of said first and second cartridge engaging devices and to produce flipping displacement of said first and second cartridge engaging devices;

d) a passively switchable linkage assembly adapted to transfer mechanical energy from said unitary reversible drive to said first and second cartridge engaging devices, said linkage assembly comprising:

i) a toggle adapted to alternatingly engage said first cartridge engaging device and said second cartridge engaging device;

ii) a first base adapted to receive and retain said toggle, said first cartridge engaging device, and said second cartridge engaging device;

iii) a push bar adapted to guide said toggle into engagement with one of said first cartridge engaging device and said second cartridge engaging device;

iv) a second base adapted to receive and retain said push bar; and v) a shaft drivingly connected to said drive and adapted to displace said first base and said second base, said shaft defining a central longitudinal axis;

e) a first engagement operating state wherein said toggle is fixedly engaged with said first cartridge engaging device and said toggle is disengaged from said second cartridge engaging device;

f) a second engagement operating state wherein said toggle is fixedly engaged with said second cartridge engaging device and said toggle is disengaged from said first cartridge engaging device;

g) a home operating mode wherein said first base is in abutting engagement with said second base, and said dual cartridge engaging assembly is in one of said first engagement operating state and said second engagement operating state;

h) a cartridge displacement operating mode wherein said dual cartridge engaging assembly is in one of said first engagement operating state and said second engagement operating state;

i) a first switch operating mode wherein said toggle is released from said second engagement operating state and engaged into said first engagement operating state;

j) a second switch operating mode wherein said toggle is released from said first engagement operating state and engaged into said second engagement operating state; and k) wherein said first base is linearly displaceable along said central longitudinal axis during each of said cartridge displacement operating mode, said first switch operating mode, and said second switch operating mode.

19. A dual cartridge engaging assembly comprising:

a) a first cartridge engaging device adapted to engage a cartridge and displace said cartridge along a first longitudinal cartridge displacement path;

b) a second cartridge engaging device substantially identical to said first cartridge engaging device and adapted to engage a cartridge and displace said cartridge along a second longitudinal cartridge displacement path;

c) a toggle adapted to alternatingly engage said first cartridge engaging device and said second cartridge engaging device to alternatingly transfer mechanical energy from a drive to said first cartridge engaging device and said second cartridge engaging device;

d) a first base adapted to receive and retain said toggle, said first cartridge engaging device, and said second cartridge engaging device;

e) a push bar adapted to guide said toggle into engagement with one of said first cartridge engaging device and said second cartridge engaging device;

f) a second base adapted to receive and retain said push bar;

g) a shaft adapted to displace said first base, said shaft defining a central longitudinal axis which is parallel to said first and second longitudinal cartridge displacement paths;

h) said drive constructed and arranged to provide reversible torque to said shaft to rotatably drive said shaft;

i) a first engagement operating state wherein said toggle is fixedly engaged with said first cartridge engaging device and said toggle is disengaged from said second cartridge engaging device;

j) a second engagement operating state wherein said toggle is fixedly engaged with said second cartridge engaging device and said toggle is disengaged from said first cartridge engaging device;

k) a home operating mode wherein said first base is in abutting engagement with said second base, and said dual cartridge engaging assembly is in one of said first engagement operating state and said second engagement operating state;

l) a cartridge displacement operating mode wherein said first base is displaced along said central longitudinal axis, and said dual cartridge engaging assembly is in one of said first engagement operating state and said second engagement operating state;

m) a first switch operating mode wherein said toggle is released from said second engagement operating state and engaged into said first engagement operating state;

n) a second switch operating mode wherein said toggle is released from said first engagement operating state and engaged into said second engagement operating state;

o) a flip operating mode wherein said first cartridge engaging device, said second cartridge engaging device, said first base, said second base, said toggle, and said push bar are flipped around said central longitudinal axis;

p) stationary third base adapted to provide an abutting surface against which said second base is held during said flip operating mode; and q) park assembly adapted to engage said first base prior to said cartridge engaging assembly entering said flip operating mode.

* * * * *